(12) United States Patent
Kageura et al.

(10) Patent No.: US 11,945,429 B2
(45) Date of Patent: Apr. 2, 2024

(54) NON-TRANSITORY STORAGE MEDIUM, VEHICLE CONTROL DEVICE, AND METHOD FOR GENERATING DATA STRUCTURE

(71) Applicant: TOYOTA JIDOSHA KABUSHIKI KAISHA, Toyota (JP)

(72) Inventors: Yoshiyuki Kageura, Sunto-gun (JP); Yoshihiro Sakayanagi, Mishima (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 17/180,930

(22) Filed: Feb. 22, 2021

(65) Prior Publication Data

US 2021/0291802 A1 Sep. 23, 2021

(30) Foreign Application Priority Data

Mar. 17, 2020 (JP) .................................. 2020-046581

(51) Int. Cl.
*B60W 20/00* (2016.01)
*B60K 6/28* (2007.10)
(Continued)

(52) U.S. Cl.
CPC ............... *B60W 20/00* (2013.01); *B60K 6/28* (2013.01); *B60W 50/0097* (2013.01);
(Continued)

(58) Field of Classification Search
None
See application file for complete search history.

(56) References Cited

U.S. PATENT DOCUMENTS

| 10,614,325 B1 * | 4/2020 | Ginsberg | ......... G08G 1/096791 |
| 2003/0172643 A1 * | 9/2003 | Suzuki | ..................... B60K 6/48 |
| | | | 903/905 |

(Continued)

FOREIGN PATENT DOCUMENTS

| EP | 2 228 275 A2 | 9/2010 |
| EP | 2228275 A2 * | 9/2010 .......... B60L 15/2045 |

(Continued)

OTHER PUBLICATIONS

PE2E Search Translation into English of JP-2018100035-A (Year: 2018).*

(Continued)

*Primary Examiner* — Thomas E Worden
(74) *Attorney, Agent, or Firm* — Oblon, McClelland, Maier & Neustadt, L.L.P.

(57) ABSTRACT

A non-transitory storage medium for use in an information processing device in a vehicle control system. The storage medium stores: pieces of positional information; pieces of cumulative relative frequency distribution information associated with individual vehicle traveling directions, the pieces of cumulative relative frequency distribution information being related to data on traveling loads associated with the individual vehicle traveling directions on a plurality of vehicles having traveled through points indicated by the pieces of positional information, or data on traveling load amounts depending on a traveling time or a traveling distance from the points; and instructions that are executable by processors to perform functions comprising calculating a predicted value of the traveling load amount depending on the traveling time or the traveling distance from an arbitrary point based on the cumulative relative frequency distribution information associated with individual vehicle traveling directions at the arbitrary point.

11 Claims, 15 Drawing Sheets

(51) Int. Cl.
*B60W 50/00* (2006.01)
*F01N 3/20* (2006.01)
*G07C 5/04* (2006.01)

(52) U.S. Cl.
CPC .............. *F01N 3/2013* (2013.01); *G07C 5/04* (2013.01); *B60W 2530/10* (2013.01); *B60W 2530/13* (2021.08); *B60Y 2200/92* (2013.01)

(56) References Cited

U.S. PATENT DOCUMENTS

| | | | | |
|---|---|---|---|---|
| 2010/0235025 | A1* | 9/2010 | Richter | B60W 10/26 701/22 |
| 2010/0235030 | A1* | 9/2010 | Xue | B60L 50/16 180/65.21 |
| 2015/0066270 | A1* | 3/2015 | Ogawa | B60L 53/64 701/400 |
| 2016/0076894 | A1* | 3/2016 | Choi | B60W 50/0097 701/461 |
| 2018/0091076 | A1* | 3/2018 | Koguchi | H02J 7/00 |
| 2020/0172081 | A1* | 6/2020 | Sakayanagi | B60W 40/105 |

FOREIGN PATENT DOCUMENTS

| | | | |
|---|---|---|---|
| EP | 3 659 845 | A2 | 6/2020 |
| JP | 2003-269208 | A | 9/2003 |
| JP | 2009-01 4502 | A | 1/2009 |
| JP | 2009014502 | A * | 1/2009 |
| JP | 2014-126981 | A | 7/2014 |
| JP | 2014126981 | A * | 7/2014 |
| JP | 2015-157566 | A | 9/2015 |
| JP | 2016-203770 | A | 12/2016 |
| JP | 2016-205386 | A | 12/2016 |
| JP | 2016-224594 | A | 12/2016 |
| JP | 2018-100035 | A | 6/2018 |
| JP | 2018100035 | A * | 6/2018 |
| JP | 2019-85108 | A | 6/2019 |
| KR | 10-1484225 | B1 | 1/2015 |
| KR | 10-1621649 | B1 | 5/2016 |
| WO | WO 2011/160995 | A1 | 12/2011 |
| WO | WO 2013/132593 | A1 | 9/2013 |
| WO | WO 2015/124979 | A1 | 8/2015 |
| WO | WO-2015124979 | A1 * | 8/2015 ............ B60W 10/06 |

OTHER PUBLICATIONS

PE2E Search Translation into English of JP-2014126981-A (Year: 2014).*

PE2E Search Translation into English of JP-2009014502-A (Year: 2009).*

* cited by examiner

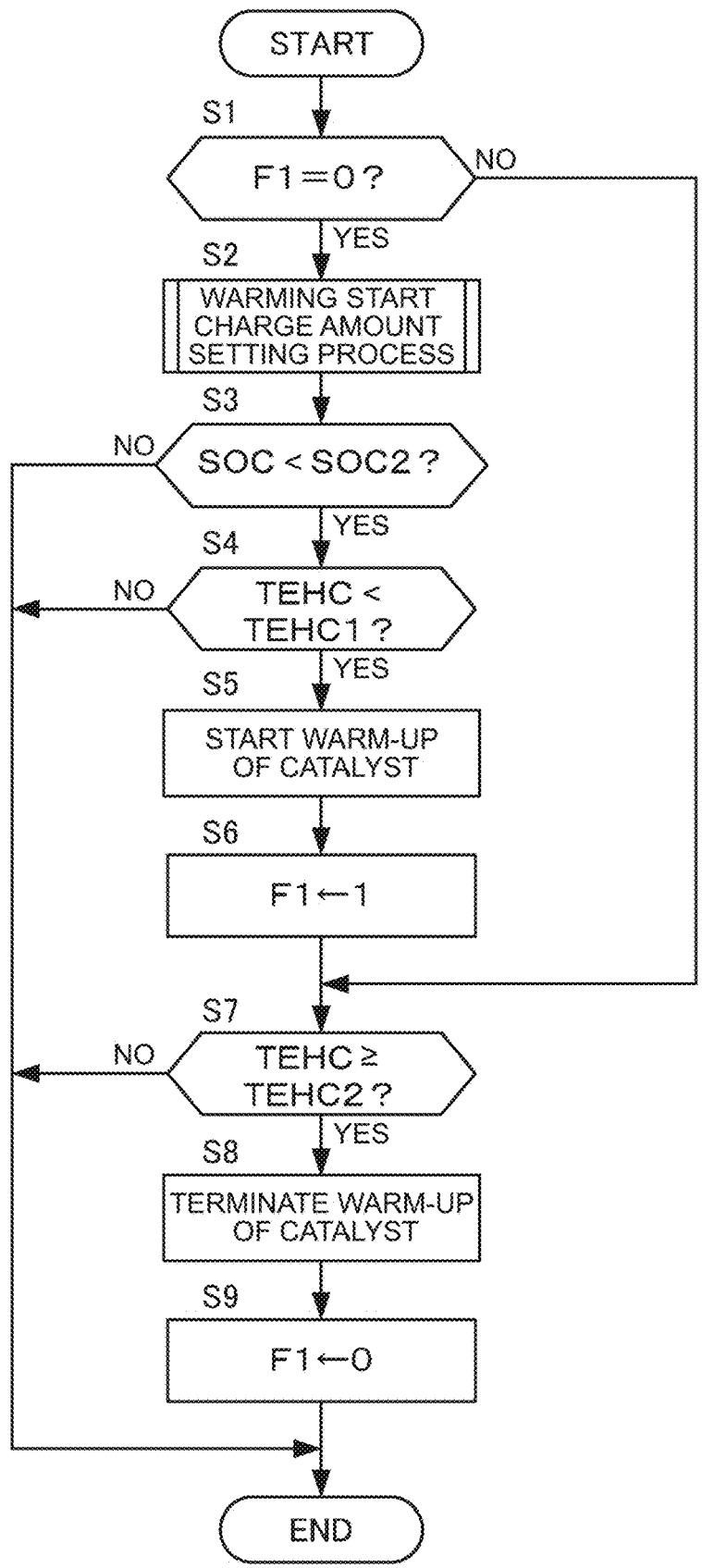

NON-TRANSITORY STORAGE MEDIUM, VEHICLE CONTROL DEVICE, AND METHOD FOR GENERATING DATA STRUCTURE

CROSS-REFERENCE TO RELATED APPLICATION

This application claims priority to Japanese Patent Application No. 2020-046581 filed on Mar. 17, 2020, incorporated herein by reference in its entirety.

BACKGROUND

1. Technical Field

The present disclosure relates to a non-transitory storage medium, a vehicle control device, and a method for generating a data structure.

2. Description of Related Art

Japanese Unexamined Patent Application Publication No. 2003-269208 (JP 2003-269208 A) discloses a control device for a hybrid vehicle (HV). In the control device, when a battery charge amount is equal to or smaller than a predetermined lower limit charge amount, an internal combustion engine is started to charge a battery. To start the internal combustion engine after prewarming a catalyst device, the catalyst device is electrically heated (preheated) by a heater or the like when the battery charge amount is equal to or smaller than a predetermined warming start charge amount that is larger than the lower limit charge amount.

SUMMARY

During the preheating in which the catalyst device is being electrically heated, traveling energy for causing the vehicle to travel by driving a traction motor is necessary in addition to energy supplied to the catalyst device. To appropriately set the warming start charge amount, it is necessary to accurately predict a traveling energy amount to be needed during the preheating.

There is a problem that the traveling energy amount to be needed during the preheating is difficult to predict because a traveling load changes variously depending on, for example, a traveling route or a traffic condition during the preheating. That is, there is a problem that the traveling energy amount to be needed to travel during a certain period in the future is difficult to predict because the traveling load changes variously depending on, for example, a traveling route or a traffic condition in that period.

The present disclosure has been made in view of the problem described above, and has an object to provide a data structure necessary to accurately predict a traveling energy amount (traveling load amount) to be needed in the future.

A first aspect of the present disclosure relates to a non-transitory storage medium for use in an information processing device in a vehicle control system, the storage medium storing: pieces of positional information; pieces of cumulative relative frequency distribution information associated with individual vehicle traveling directions, the pieces of cumulative relative frequency distribution information being related to data on traveling loads at points indicated by the pieces of positional information on a plurality of vehicles having traveled through the points, or data on traveling load amounts depending on a traveling time or a traveling distance from the points; and instructions that are executable by one or more processors and that cause the one or more processors to perform functions comprising calculating a predicted value of a traveling load amount depending on the traveling time or the traveling distance from an arbitrary point based on the cumulative relative frequency distribution information associated with individual vehicle traveling directions at the arbitrary point.

A second aspect of the present disclosure relates to a vehicle control device including an electronic control unit, the electronic control unit being configured to control a vehicle in a vehicle control system based on a predicted value of a traveling load amount that is calculated by using a data structure, the data structure being used by an information processing device in the vehicle control system, the data structure including: pieces of positional information; and pieces of cumulative relative frequency distribution information associated with individual vehicle traveling directions, the pieces of cumulative relative frequency distribution information being related to data on traveling loads at points indicated by the pieces of positional information on a plurality of vehicles having traveled through the points, or data on traveling load amounts depending on a traveling time or a traveling distance from the points, the information processing device being configured to calculate, by using the data structure, a predicted value of the traveling load amount depending on the traveling time or the traveling distance from an arbitrary point based on the cumulative relative frequency distribution information associated with individual vehicle traveling directions at the arbitrary point.

A third aspect of the present disclosure relates to a method for generating a data structure by an information processing device in a vehicle control system, the method including: acquiring time-series data of pieces of positional information and traveling loads at individual points where vehicles have traveled; calculating, based on the time-series data, traveling directions of the vehicles from which the time-series data is acquired, and traveling load amounts of the vehicles depending on a traveling time or a traveling distance from the individual points where the pieces of positional information are acquired; accumulating, in association with the individual points and the individual traveling directions, data on the calculated traveling load amounts depending on the traveling time or the traveling distance from the individual points; and creating, in association with the individual points and the individual traveling directions, cumulative relative frequency distributions of the traveling load amounts depending on the traveling time or the traveling distance from the individual points based on the data on the traveling load amounts that is accumulated in association with the individual points and the individual traveling directions.

By using the aspects of the present disclosure, it is possible to accurately predict the traveling energy amount (traveling load amount) of the vehicle to be needed in the future.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart illustrating catalyst warming control to be executed in each vehicle according to the first embodiment of the present disclosure;

DETAILED DESCRIPTION OF EMBODIMENTS

Embodiments of the present disclosure are described below in detail with reference to the drawings. In the following description, the same components are represented by the same reference symbols.

First Embodiment

Figure 1:
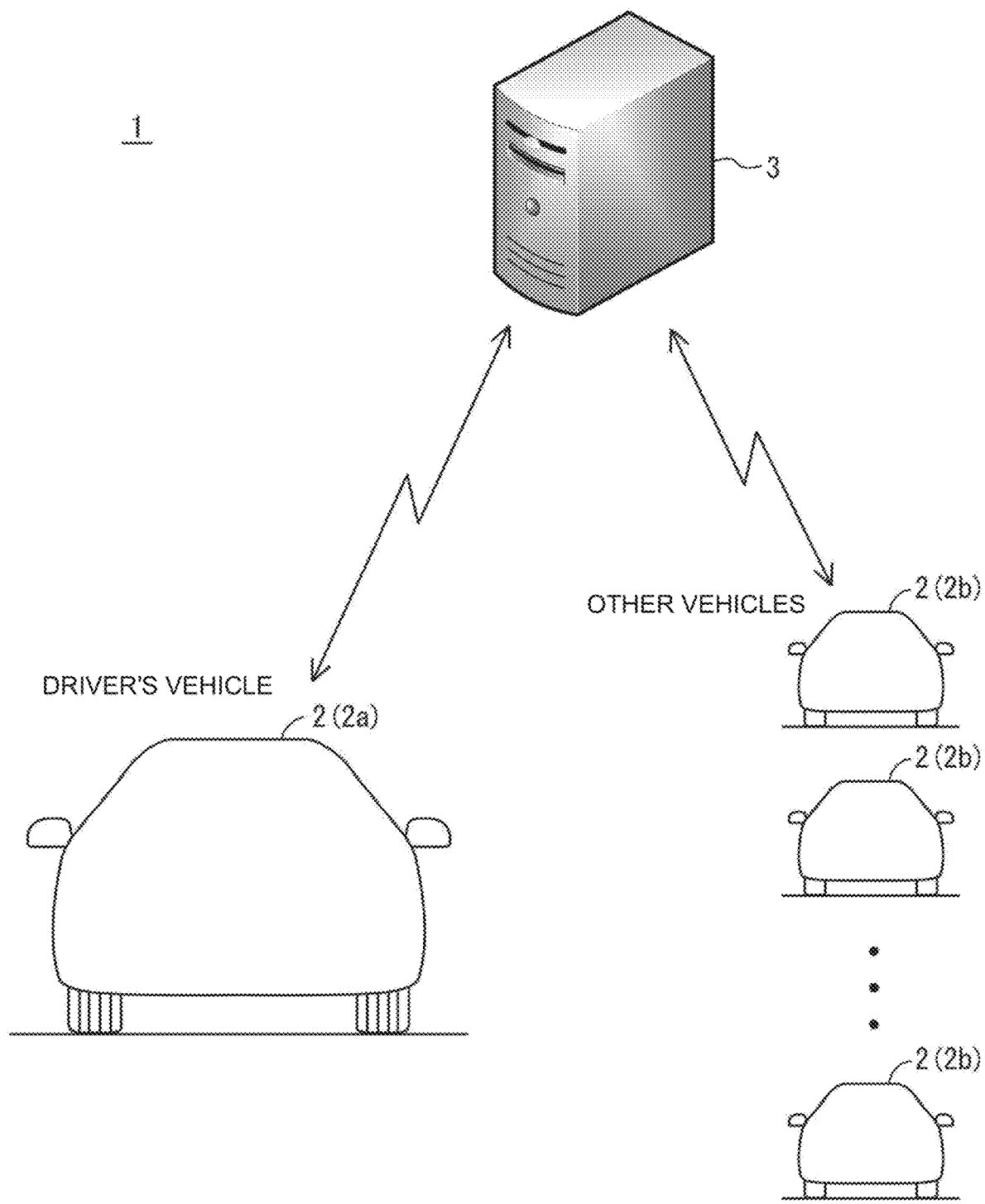
FIG. 1 is a schematic diagram illustrating the overall configuration of a vehicle control system.

FIG. 1 is a schematic diagram illustrating the overall configuration of a vehicle control system 1 according to a first embodiment of the present disclosure.

The vehicle control system 1 includes a plurality of vehicles 2 and a server 3.

Each vehicle 2 is communicable with the server 3 by wireless. In this embodiment, each vehicle 2 transmits traveling record information of the vehicle 2 to the server 3 at a predetermined timing. The traveling record information is time-series data of pieces of positional information and traveling loads at points that the vehicle 2 has traveled through.

The server 3 can accumulate and compile the traveling record information received from each vehicle 2. In response to a request from the vehicle 2, the server 3 transmits, to the vehicle 2, information obtained from the data compiled in the server 3.

Thus, the vehicle control system 1 is configured such that each vehicle 2 can provide the traveling record information of the vehicle 2 to the server 3 and use the information obtained from the data obtained by compiling the traveling record information in the server 3.

In the following description, a vehicle 2 that performs traveling control and the like described later according to this embodiment is referred to as "driver's vehicle 2a" as necessary, and a vehicle 2 other than the driver's vehicle 2a is referred to as "other vehicle 2b" as necessary. In this embodiment, the driver's vehicle 2a is a hybrid vehicle or a plug-in hybrid vehicle. The type of the other vehicle 2b is not particularly limited. Examples of the other vehicle 2b include a hybrid vehicle and a plug-in hybrid vehicle similarly to the driver's vehicle 2a, electric vehicles (such as a battery electric vehicle and a fuel cell vehicle) different from the driver's vehicle 2a, and a vehicle having only an internal combustion engine as a driving power source.

Figure 2:
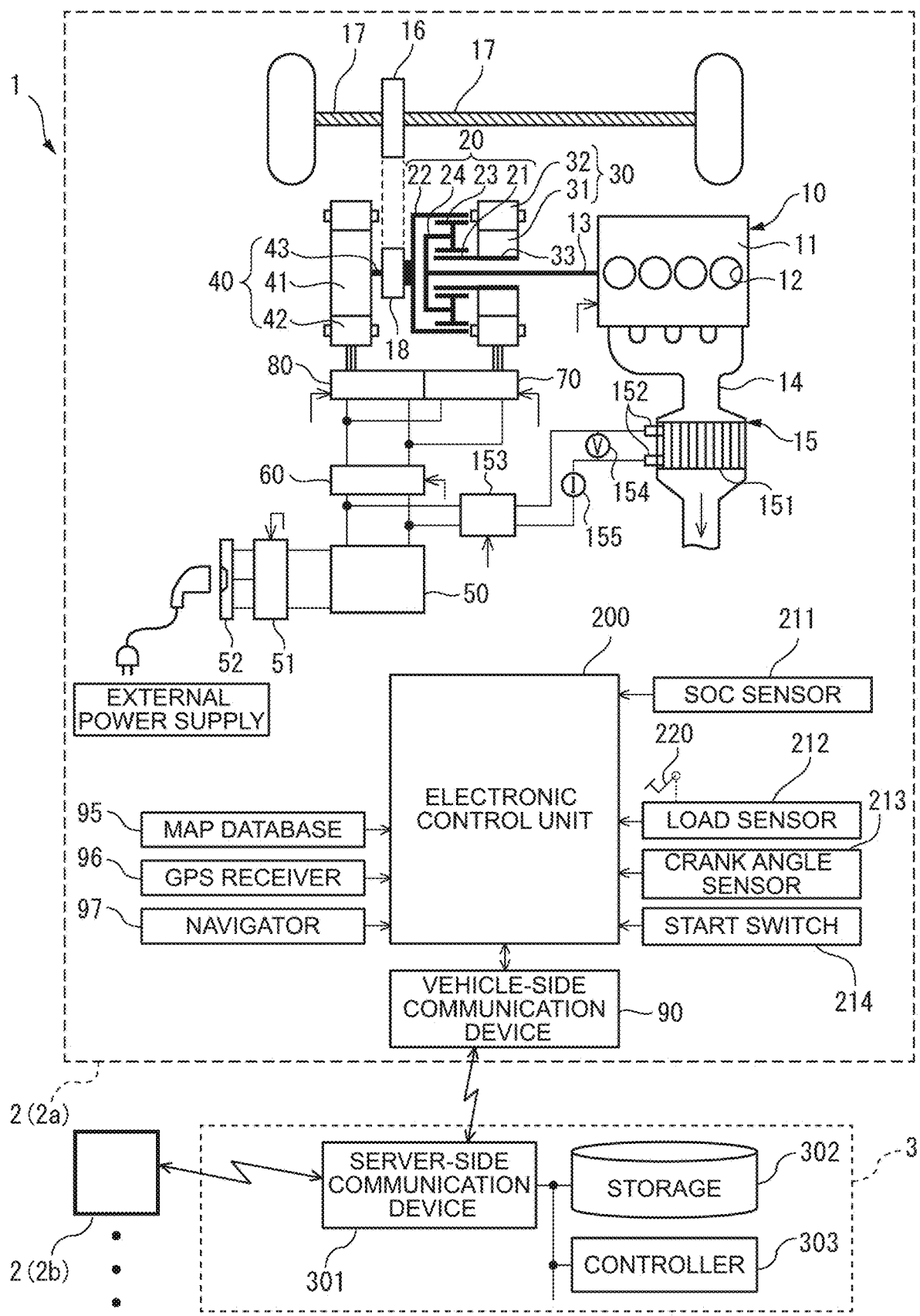
FIG. 2 is a diagram illustrating detailed hardware configurations of a driver's vehicle and a server in the vehicle control system.

FIG. 2 is a diagram illustrating detailed hardware configurations of the driver's vehicle 2a and the server 3 in the vehicle control system 1.

The driver's vehicle 2a is a hybrid vehicle including an internal combustion engine 10, a power split device 20, a first rotating electrical machine 30, a second rotating electrical machine 40, a battery 50, a boost converter 60, a first inverter 70, a second inverter 80, a vehicle-side communication device 90, and an electronic control unit 200. The driver's vehicle 2a can transmit driving power of one or both of the internal combustion engine 10 and the second rotating electrical machine 40 to wheel driving shafts 17 via a final speed reducer 16. In addition to the internal combustion engine 10 and other components, the driver's vehicle 2a includes a map database 95, a global positioning system (GPS) receiver 96, and a navigator 97.

The internal combustion engine 10 generates driving power for rotating an output shaft 13 by burning fuel in cylinders 12 formed in an engine body 11. Exhaust gas discharged from the cylinders 12 to an exhaust passage 14 is discharged into the atmosphere through the exhaust passage 14. The exhaust passage 14 is provided with an electrically-heated catalyst device 15 configured to remove toxic substances in the exhaust gas.

The electrically-heated catalyst device 15 includes a conductive substrate 151, a pair of electrodes 152, a voltage regulation circuit 153, a voltage sensor 154, and a current sensor 155.

The conductive substrate 151 is made of a material such as silicon carbide (SiC) or molybdenum di silicide ($MoSi_2$), which generates heat through energization. The conductive substrate 151 has a plurality of passages (hereinafter referred to as "unit cells") having a grid (or honeycomb) sectional shape along a flow direction of exhaust gas. A catalyst is supported on the surfaces of the unit cells. The catalyst to be supported on the conductive substrate 151 is not particularly limited. A catalyst necessary to obtain desired exhaust gas control performance may be selected from among various catalysts as appropriate and supported on the conductive substrate 151.

The electrodes 152 apply a voltage to the conductive substrate 151. The electrodes 152 are electrically connected to the conductive substrate 151 and connected to the battery 50 via the voltage regulation circuit 153. By applying the voltage to the conductive substrate 151 via the electrodes 152, a current flows through the conductive substrate 151 to generate heat in the conductive substrate 151, thereby heating the catalyst supported on the conductive substrate 151.

A voltage Vh [V] to be applied to the conductive substrate 151 via the electrodes 152 (hereinafter referred to as "substrate-application voltage") can be regulated by controlling the voltage regulation circuit 153 by the electronic control unit 200. For example, a voltage of the battery 50 may be applied as it is or by being stepped up or down to an arbitrary voltage. In this embodiment, electric power Ph [kW] to be supplied to the conductive substrate 151 (hereinafter referred to as "substrate-supply power") can be controlled to arbitrary electric power by controlling the voltage regulation circuit 153 by the electronic control unit 200.

The voltage sensor 154 detects the substrate-application voltage Vh. In this embodiment, the voltage regulation circuit 153 is controlled based on the substrate-application voltage Vh detected by the voltage sensor 154 so that the substrate-application voltage Vh reaches a predetermined rated voltage Vmax.

The current sensor 155 detects a current Ih [A] flowing through the conductive substrate 151 when the voltage is applied to the conductive substrate 151.

The power split device 20 is a planetary gearing configured to split power output from the internal combustion engine 10 into two power components, that is, driving power for rotating the wheel driving shafts 17 and driving power for regeneratively driving the first rotating electrical machine 30. The power split device 20 includes a sun gear 21, a ring gear 22, pinion gears 23, and a planetary carrier 24.

The sun gear 21 is an external gear arranged at the center of the power split device 20. The sun gear 21 is coupled to a rotation shaft 33 of the first rotating electrical machine 30.

The ring gear 22 is an internal gear arranged around the sun gear 21 concentrically with the sun gear 21. The ring gear 22 is coupled to a rotation shaft 43 of the second rotating electrical machine 40. A drive gear 18 is integrally attached to the ring gear 22 to transmit rotation of the ring gear 22 to the wheel driving shafts 17 via the final speed reducer 16.

The pinion gears 23 are a plurality of external gears arranged between the sun gear 21 and the ring gear 22 so as to mesh with the sun gear 21 and the ring gear 22.

The planetary carrier 24 is coupled to the output shaft 13 of the internal combustion engine 10, and rotates about the output shaft 13. The planetary carrier 24 is also coupled to the pinion gears 23 so that the pinion gears 23 can rotate about their axes and also rotate (revolve) about the sun gear 21 when the planetary carrier 24 rotates.

For example, the first rotating electrical machine 30 is a three-phase alternating-current (AC) synchronous motor generator including a rotor 31 and a stator 32. The rotor 31 is attached to the outer periphery of the rotation shaft 33 coupled to the sun gear 21, and a plurality of permanent magnets is embedded in the outer periphery of the rotor 31. Exciting coils are wound around the stator 32 to generate a rotating magnetic field. The first rotating electrical machine 30 functions as a motor configured to perform power running by being supplied with electric power from the battery 50, and as a generator configured to perform regenerative driving by receiving driving power from the internal combustion engine 10.

In this embodiment, the first rotating electrical machine 30 is mainly used as the generator. To crank the internal combustion engine 10 by rotating the output shaft 13, the first rotating electrical machine 30 is used as the motor to function as a starter.

For example, the second rotating electrical machine 40 (traction motor) is a three-phase AC synchronous motor generator including a rotor 41 and a stator 42. The rotor 41 is attached to the outer periphery of the rotation shaft 43 coupled to the ring gear 22, and a plurality of permanent magnets is embedded in the outer periphery of the rotor 41. Exciting coils are wound around the stator 42 to generate a rotating magnetic field. The second rotating electrical machine 40 functions as a motor configured to perform power running by being supplied with electric power from the battery 50, and as a generator configured to perform regenerative driving by receiving driving power from the wheel driving shafts 17 during, for example, deceleration of the vehicle.

The battery 50 is a chargeable and dischargeable secondary battery such as a nickel-cadmium battery, a nickel metal hydride battery, or a lithium ion battery. In this embodiment, a lithium ion secondary battery having a rated voltage of about 200 V is used as the battery 50. The battery 50 is electrically connected to the first rotating electrical machine 30 and the second rotating electrical machine 40 via, for example, the boost converter 60 so that the first rotating electrical machine 30 and the second rotating electrical machine 40 can perform power running by being supplied with charged power of the battery 50, and that the battery 50 can be charged with electric power generated by the first rotating electrical machine 30 and the second rotating electrical machine 40.

In this embodiment, the battery 50 is electrically connectable to an external power supply such as a wall outlet of a house via a charging control circuit 51 and a charging lid 52 so that the battery 50 can be charged from the external power supply. The charging control circuit 51 is an electric circuit configured to, based on a control signal from the electronic control unit 200, charge the battery 50 with electric power from the external power supply by converting an alternating current supplied from the external power supply into a direct current (DC) and stepping up an input voltage to a battery voltage.

The boost converter 60 includes an electric circuit configured to, based on a control signal from the electronic control unit 200, step up a terminal-to-terminal voltage at a primary terminal and output the voltage from a secondary terminal, and configured to, based on a control signal from the electronic control unit 200, step down a terminal-to-terminal voltage at the secondary terminal and output the voltage from the primary terminal. The primary terminal of the boost converter 60 is connected to an output terminal of the battery 50. The secondary terminal of the boost converter 60 is connected to DC terminals of the first inverter 70 and the second inverter 80.

Each of the first inverter 70 and the second inverter 80 includes an electric circuit configured to, based on a control signal from the electronic control unit 200, convert a direct current input from the DC terminal into an alternating current (in this embodiment, a three-phase alternating current) and output the alternating current from an AC terminal, and configured to, based on a control signal from the electronic control unit 200, convert an alternating current input from the AC terminal into a direct current and output the direct current from the DC terminal. The DC terminal of the first inverter 70 is connected to the secondary terminal of the boost converter 60. The AC terminal of the first inverter 70 is connected to an input/output terminal of the first rotating electrical machine 30. The DC terminal of the second inverter 80 is connected to the secondary terminal of the boost converter 60. The AC terminal of the second inverter 80 is connected to an input/output terminal of the second rotating electrical machine 40.

The vehicle-side communication device 90 is communicable with a server-side communication device 301 of the server 3 by wireless. The vehicle-side communication device 90 transmits, to the server 3, traveling record information of the driver's vehicle 2a that is transmitted from the electronic control unit 200, and transmits, to the electronic control unit 200, various types of information received from the server 3.

The map database 95 is a database related to map information. For example, the map database 95 is stored in a hard disk drive (HDD) mounted on the driver's vehicle 2a. The map information contains various types of road information such as positional information of roads, road shape information (for example, gradients, types of curve and straight part, and curvatures of curves), positional information of intersections and junctions, types of road, and vehicle speed limits.

The GPS receiver 96 receives signals from three or more GPS satellites to identify the latitude and the longitude of the driver's vehicle 2a, thereby detecting a current position of the driver's vehicle 2a. The GPS receiver 96 transmits information on the detected current position of the driver's vehicle 2a to the electronic control unit 200.

The navigator 97 sets a planned traveling route of the driver's vehicle 2a based on, for example, information on a current position of the driver's vehicle 2a that is detected by the GPS receiver 96, the map information in the map database 95, and a destination set by the driver. The navigator 97 transmits information related to the set planned traveling route to the electronic control unit 200 as navigation information.

The electronic control unit 200 is a microcomputer including a central processing unit (CPU), a read-only memory (ROM), a random-access memory (RAM), an input port, and an output port, which are connected together via a bidirectional bus.

The electronic control unit 200 receives not only signals input from the voltage sensor 154 and the current sensor 155 but also output signals input from various sensors such as a state of charge (SOC) sensor 211, a load sensor 212, a crank angle sensor 213, and a start switch 214. The SOC sensor 211 detects a battery charge amount SOC. The load sensor 212 generates an output voltage proportional to a depression amount of an accelerator pedal 220. The crank angle sensor 213 generates an output pulse as a signal for calculating an engine speed or the like every time a crankshaft (not illustrated) of the engine body 11 rotates by, for example, 15°. The start switch 214 is used for determining whether the driver's vehicle 2a is started or stopped. The electronic control unit 200 controls the driver's vehicle 2a by driving individual control parts based on the output signals input from the sensors.

The server 3 includes the server-side communication device 301, a storage 302, and a controller 303. The server-side communication device 301, the storage 302, and the controller 303 are connected together via signal lines.

The server-side communication device 301 is communicable with the vehicle-side communication device 90 of each vehicle 2 (driver's vehicle 2a or other vehicle 2b) by wireless. In response to requests from the vehicle 2, the server-side communication device 301 transmits, to the vehicle 2, various types of information transmitted from the controller 303, and transmits, to the controller 303, traveling record information received from the vehicle 2.

The storage 302 includes a storage medium such as a hard disk drive, an optical recording medium, or a semiconductor memory to store computer programs to be executed by the controller 303. The storage 302 also stores data generated by the controller 303, and traveling information received from each vehicle 2 by the controller 303.

The controller 303 includes one or more processors configured to execute the computer programs for control and calculation in the server 3, and a peripheral circuit of the processors.

Description is given of various types of control to be executed by the electronic control unit 200 according to this embodiment, and various types of control to be executed by the server 3 along with the control executed by the electronic control unit 200.

First, description is given of details of basic traveling control for the driver's vehicle 2a, more specifically, details of basic switching control for traveling modes to be executed by the electronic control unit 200.

The electronic control unit 200 causes the driver's vehicle 2a to travel by switching, based on the battery charge amount SOC, the traveling mode to an electric vehicle (EV) mode or a charge sustaining (CS) mode. Specifically, the electronic control unit 200 sets the traveling mode of the vehicle 2 to the EV mode when the battery charge amount is equal to or larger than a predetermined mode switching charge amount SOC1 (for example, 10% of a full charge amount).

In the EV mode, the second rotating electrical machine 40 is driven to perform power running by using the charged power of the battery 50 with priority, and driving power of at least the second rotating electrical machine 40 is transmitted to the wheel driving shafts 17, thereby causing the driver's vehicle 2a to travel.

When the traveling mode is the EV mode, the electronic control unit 200 drives the second rotating electrical machine 40 to perform power running by using the charged power of the battery 50 while stopping the internal combustion engine 10, and rotates the wheel driving shafts 17 with driving power of the second rotating electrical machine 40 alone, thereby causing the driver's vehicle 2a to travel. That is, when the traveling mode is the EV mode, the electronic control unit 200 causes the driver's vehicle 2a to travel by controlling, while stopping the internal combustion engine 10, power to be output from the second rotating electrical machine 40 based on a traveling load so that the power reaches requested power depending on the traveling load.

When the battery charge amount SOC is smaller than the mode switching charge amount SOC1, the electronic control unit 200 sets the traveling mode of the driver's vehicle 2a to the charge sustaining (CS) mode.

In the CS mode, the driver's vehicle 2a travels so that the battery charge amount SOC is kept at a battery charge amount when the traveling mode is switched to the CS mode (hereinafter referred to as "keeping charge amount").

Figure 3:
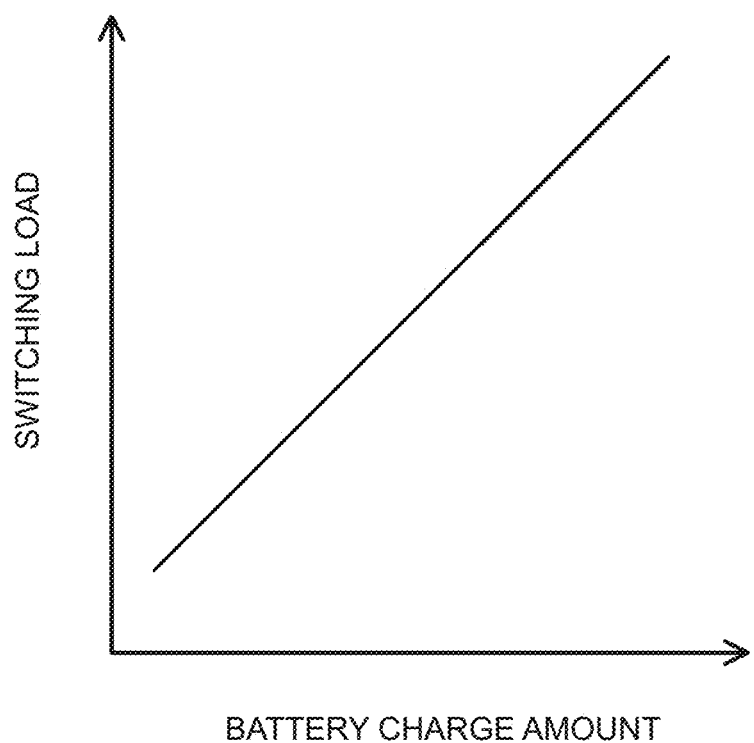
FIG. 3 is a diagram illustrating a relationship between a battery charge amount and a switching load.

When the traveling mode is the CS mode, the electronic control unit 200 causes the driver's vehicle 2a to travel by further switching the traveling mode to a CSEV mode or a CSHV mode. Specifically, the electronic control unit 200 sets the traveling mode to the CSEV mode when the traveling mode is the CS mode and when the traveling load is smaller than a switching load, and sets the traveling mode to the CSHV mode when the traveling mode is the CS mode and when the traveling load is equal to or larger than the switching load. As illustrated in FIG. 3, the electronic control unit 200 changes the switching load depending on the battery charge amount SOC such that the switching load decreases as the battery charge amount SOC decreases.

The CSEV mode is similar to the EV mode. That is, the second rotating electrical machine 40 is driven to perform power running by using the charged power of the battery 50 with priority, and driving power of at least the second rotating electrical machine 40 is transmitted to the wheel driving shafts 17, thereby causing the driver's vehicle 2*a* to travel. That is, the second rotating electrical machine 40 is driven to perform power running by using the charged power of the battery 50 while stopping the internal combustion engine 10, and the wheel driving shafts 17 are rotated with driving power of the second rotating electrical machine 40 alone, thereby causing the driver's vehicle 2*a* to travel.

In the CSHV mode, the internal combustion engine 10 is operated, the second rotating electrical machine 40 is driven to perform power running by using electric power generated by the first rotating electrical machine 30 with priority, and driving power of both the internal combustion engine 10 and the second rotating electrical machine 40 is transmitted to the wheel driving shafts 17, thereby causing the driver's vehicle 2*a* to travel. When the traveling mode is the CSHV mode, the electronic control unit 200 causes the power split device 20 to split the driving power of the internal combustion engine 10 into two power components. One split driving power of the internal combustion engine 10 is transmitted to the wheel driving shafts 17, and the other split driving power is used for regeneratively driving the first rotating electrical machine 30. Basically, the second rotating electrical machine 40 is driven to perform power running by using the electric power generated by the first rotating electrical machine 30, and the driving power of the second rotating electrical machine 40 is transmitted to the wheel driving shafts 17 in addition to the one driving power of the internal combustion engine 10, thereby causing the driver's vehicle 2*a* to travel.

When the traveling mode is the CS mode, the electronic control unit 200 causes the driver's vehicle 2*a* to travel by controlling power to be output from the internal combustion engine 10 and the second rotating electrical machine 40 based on the battery charge amount SOC and the traveling load so that the power reaches requested power depending on the traveling load. The switching load is low when the battery charge amount SOC is the mode switching charge amount SOC1. Therefore, the internal combustion engine 10 is basically started when the traveling mode is switched from the EV mode to the CS mode because the battery charge amount SOC decreases to the mode switching charge amount SOC1 while the vehicle is traveling. Thus, the CS mode may be regarded as a traveling mode in which the internal combustion engine 10 is basically operated but, under a condition that the thermal efficiency of the internal combustion engine 10 is low, the driver's vehicle 2*a* can travel by using the power output from the second rotating electrical machine 40 alone.

When the traveling mode is the CS mode and when the battery charge amount is smaller than the keeping charge amount while the driver's vehicle 2*a* is stopped, the electronic control unit 200 regeneratively drives the first rotating electrical machine 30 by using driving power of the internal combustion engine 10, and charges the battery 50 with electric power generated by the first rotating electrical machine 30 so that the battery charge amount is equal to or larger than the keeping charge amount.

As described above, the CS mode is the traveling mode in which the internal combustion engine 10 is basically operated. Therefore, the internal combustion engine 10 is basically started after the traveling mode is switched from EV mode to the CS mode. The switching from the EV mode to the CS mode depends on the battery charge amount SOC. When the EV mode is switched to the CS mode and the internal combustion engine 10 is started, exhaust gas discharged from the cylinders 12 in the engine body 11 to the exhaust passage 14 is discharged into the atmosphere through the exhaust passage 14.

Toxic substances in the exhaust gas can be removed by the catalyst device 15 when warm-up of the catalyst device 15 is completed, that is, when the temperature of the conductive substrate 151 (hereinafter referred to as "catalyst bed temperature TEHC") is equal to or higher than a predetermined active temperature TEHC2 (for example, 450[° C.]) at which the exhaust gas control function of the catalyst supported on the conductive substrate 151 is active.

For example, immediately after the internal combustion engine 10 is started, that is, before the warm-up of the catalyst device 15 is completed, the exhaust gas control function of the catalyst supported on the conductive substrate 151 starts to work when the catalyst bed temperature TEHC is equal to or higher than a predetermined activation start temperature TEHC1 (for example, 300[° C.]) that is lower than the active temperature TEHC2. However, toxic substances in exhaust gas cannot sufficiently be removed by the catalyst device 15. Therefore, the quality of exhaust gas emission decreases. To suppress the decrease in the quality of exhaust gas emission after the engine is started, it is desirable to start the warm-up of the catalyst device 15 by starting energization of the conductive substrate 151 during the EV mode and complete the warm-up of the catalyst device 15 before the EV mode is switched to the CS mode.

For example, when the battery charge amount SOC decreases to a warming start charge amount SOC2 that is larger than the mode switching charge amount SOC1 during the EV mode, the catalyst device 15 may be warmed by starting energization of the conductive substrate 151, and the warm-up of the catalyst device 15 may be completed during the EV mode before the battery charge amount SOC decreases from the warming start charge amount SOC2 to the mode switching charge amount SOC1, that is, before the EV mode is switched to the CS mode. By completing the warm-up of the catalyst device 15 in advance through preheating in which the catalyst device 15 is electrically heated during the EV mode before the engine is started, the decrease in the quality of exhaust gas emission after the engine is started can be suppressed.

Unless the warming start charge amount SOC2 is set to an appropriate value, the battery charge amount SOC may decrease to the mode switching charge amount SOC1 before the warm-up of the catalyst device 15 is completed. Then, the internal combustion engine 10 may be started before the warm-up of the catalyst device 15 is completed. As a result, the quality of exhaust gas emission may decrease after the internal combustion engine 10 is started. In this case, it is desirable to operate the internal combustion engine 10 through control for increasing the exhaust gas temperature than usual by, for example, lagging an ignition timing to complete the warm-up of the catalyst device 15 earlier.

While the ignition timing is lagged, however, there is an increase in the ratio of heat energy released without being used as output energy in the combustion energy. Therefore, the thermal efficiency decreases. As a result, the fuel efficiency decreases.

Conversely, the length of time may excessively increase from completion of the warm-up of the catalyst device 15 to the decrease in the battery charge amount SOC to the mode switching charge amount SOC1.

If the conductive substrate 151 is continuously heated by supplying electric power to the conductive substrate 151 until the battery charge amount SOC decreases to the mode switching charge amount SOC1 after the warm-up of the catalyst device 15 is completed, the electric power is consumed unnecessarily to reduce a distance that can be traveled in the EV mode (hereinafter referred to as "EV traveling distance"). Further, the conductive substrate 151 may be heated excessively to, for example, accelerate deterioration of the conductive substrate 151.

If the traveling mode is switched to the CS mode when the warm-up of the catalyst device 15 is completed, the EV traveling distance decreases because the traveling mode is switched to the CS mode before the battery charge amount SOC is equal to or smaller than the mode switching charge amount SOC1. If the energization of the conductive substrate 151 is stopped when the warm-up of the catalyst device 15 is completed, the temperature of the conductive substrate 151 decreases by the time that the battery charge amount SOC is equal to or smaller than the mode switching charge amount SOC1. Therefore, the quality of exhaust gas emission may decrease after the internal combustion engine 10 is started.

In this embodiment, the warming start charge amount SOC2 is set based on Expression (1).

[Expression (1)]

$$SOC2 = Eh + Ep + SOC1 \quad (1)$$

In Expression (1), an energy amount (electric power amount) Eh [kWh] is an amount of energy to be supplied to the conductive substrate 151 to heat the conductive substrate 151 for a predetermined preheating time T. The preheating time T is a time during which the catalyst bed temperature TEHC can be increased to the active temperature TEHC2, and is determined in advance through experiments or the like. In this embodiment, the voltage regulation circuit 153 is controlled so that the substrate-supply power Ph [kW] is constant rated power. Therefore, the energy amount Eh (=Ph×T) is a fixed value.

In Expression (1), an energy amount (electric power amount, or traveling load amount) Ep [kWh] is an amount of energy necessary to drive various auxiliary devices such as the second rotating electrical machine 40 and an air conditioner of the driver's vehicle 2a while the conductive substrate 151 is heated for the preheating time T. That is, the energy amount Ep is an amount of energy necessary for the driver's vehicle 2a to travel for the preheating time T (hereinafter referred to as "traveling energy amount for preheating time"). Assuming that a traveling load during preheating is represented by Pp [kW], the traveling energy amount Ep for the preheating time can be represented by Expression (2), and may be regarded as a traveling load amount for the preheating time.

[Expression (2)]

$$Ep = \int^T Pp(t)dt \quad (2)$$

The traveling load Pp during the preheating changes variously depending on, for example, a traveling route or a traffic condition during the preheating. Therefore, there is a problem that the traveling energy amount Ep for the preheating time from a current position of the driver's vehicle 2a is difficult to predict accurately.

Figure 4:
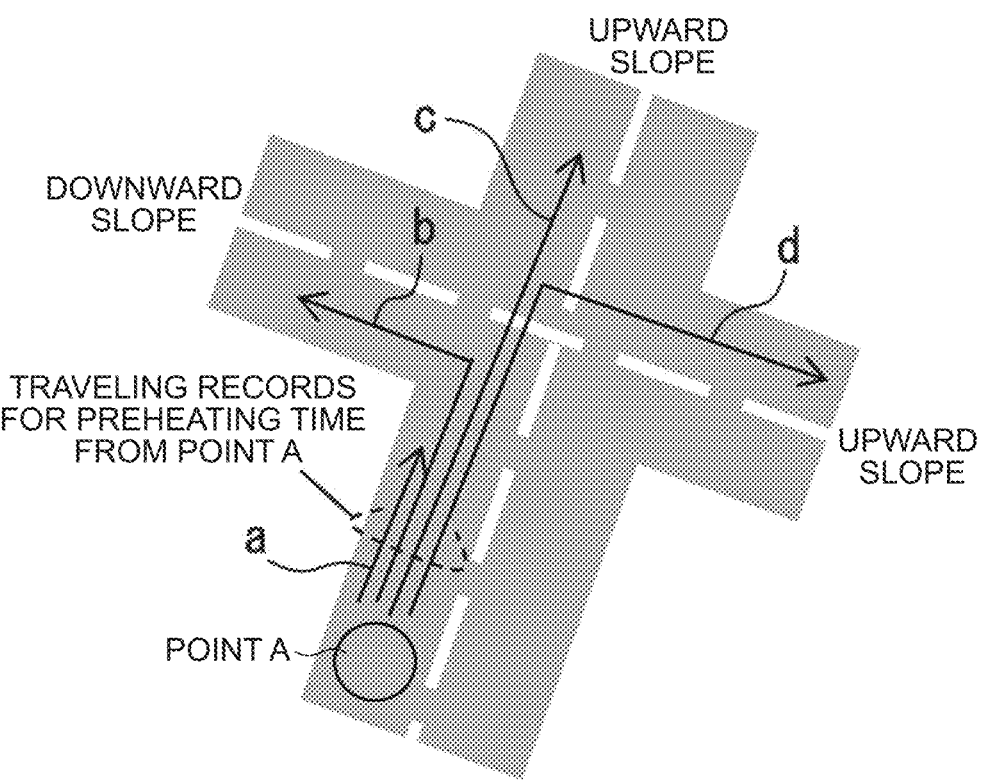
FIG. 4 is a diagram containing arrows "a" to "d" indicating examples of previous representative traveling records showing that the vehicle having passed a certain point A behind an intersection travels for a preheating time T from the point A.
Figure 5:
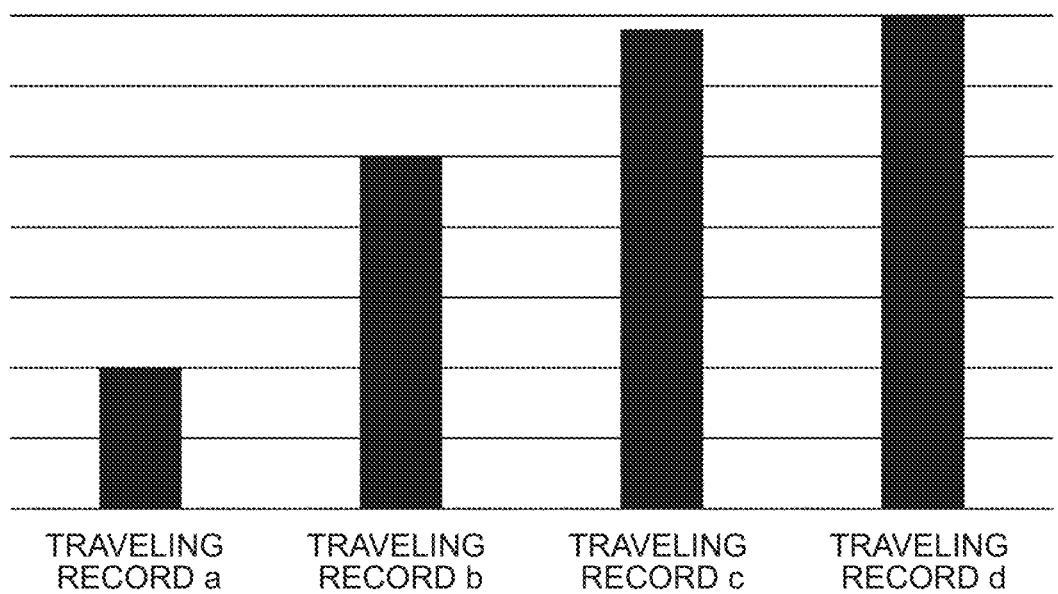
FIG. 5 is a diagram illustrating traveling energy amounts Ep for the preheating time from the point A that are compared among the traveling records.

FIG. 4 is a diagram containing arrows "a" to "d" indicating examples of previous representative traveling records showing that the vehicle 2 having passed a certain point A behind an intersection travels for the preheating time T from the point A. FIG. 5 is a diagram illustrating traveling energy amounts Ep for the preheating time from the point A that are compared among the traveling records.

In FIG. 4, the traveling record "a" shows a case where a traffic signal at the intersection is red and the vehicle 2 is stopped at the intersection while traveling at a small load. The traveling records "b" to "d" show cases where the traffic signal at the intersection is green and the vehicle 2 passes the intersection to turn left, go straight, and turn right, respectively. In the example illustrated in FIG. 4, the vehicle 2 travels along a downward slope after turning left at the intersection, and along an upward slope after going straight or turning right at the intersection.

As illustrated in FIG. 4, various traveling records are obtained when the vehicle 2 having passed the point A travels for the preheating time T from the point A. As illustrated in FIG. 5, the traveling energy amount Ep for the preheating time from the point A varies depending on the traveling records. For example, as illustrated in FIG. 5, the traveling energy amount Ep of the traveling record "a" showing the case where the vehicle 2 is stopped at the intersection while traveling at a small load tends to be smaller than the traveling energy amounts Ep of the traveling records "b" to "d" showing the cases where the vehicle 2 passes the intersection. Comparing the traveling energy amounts Ep of the traveling records "b" to "d" showing the cases where the vehicle 2 passes the intersection, the traveling energy amount Ep of the traveling record "b" in the case of the downward slope after the vehicle 2 passes the intersection tends to be smaller than the traveling energy amounts Ep of the traveling records "c" and "d" in the case of the upward slope after the vehicle 2 passes the intersection.

To appropriately set the warming start charge amount SOC2 when the current position is, for example, the point A, it is necessary to accurately predict the traveling energy amount Ep for the preheating time from the point A. As described with reference to FIG. 4 and FIG. 5, there is a problem that the traveling energy amount Ep for the preheating time from the point A is difficult to predict accurately because the traveling load Pp changes variously depending on a traveling route or a traffic condition from the point A.

In this embodiment, traveling record information is collected from each vehicle 2, and an appropriate value is calculated as a traveling energy amount Ep for the preheating time from a current position of the vehicle 2 based on data obtained by compiling the traveling record information.

Figure 6A:
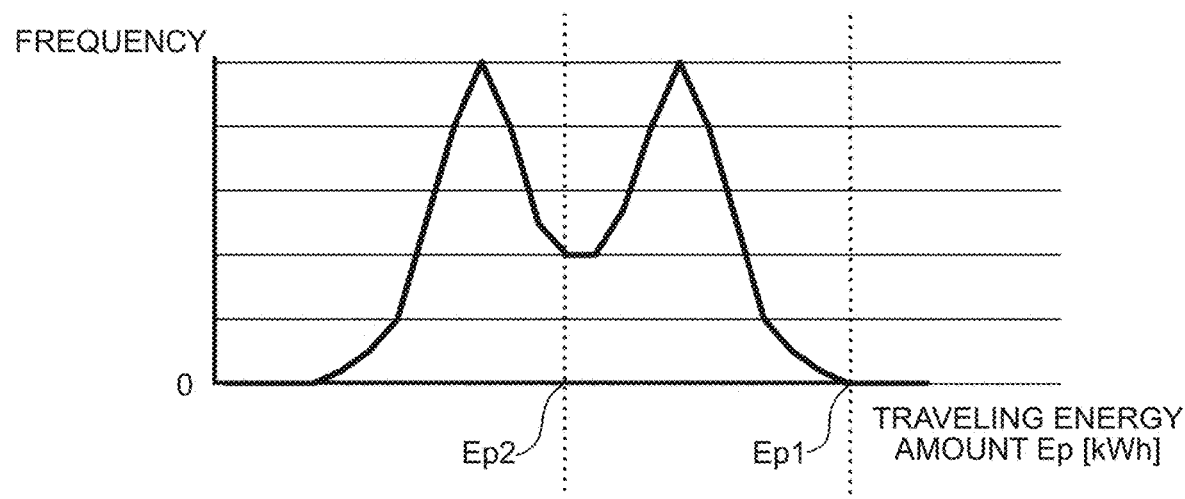
FIG. 6A is a diagram illustrating a frequency distribution of data on traveling energy amounts Ep for the preheating time from the point A.
Figure 6B:
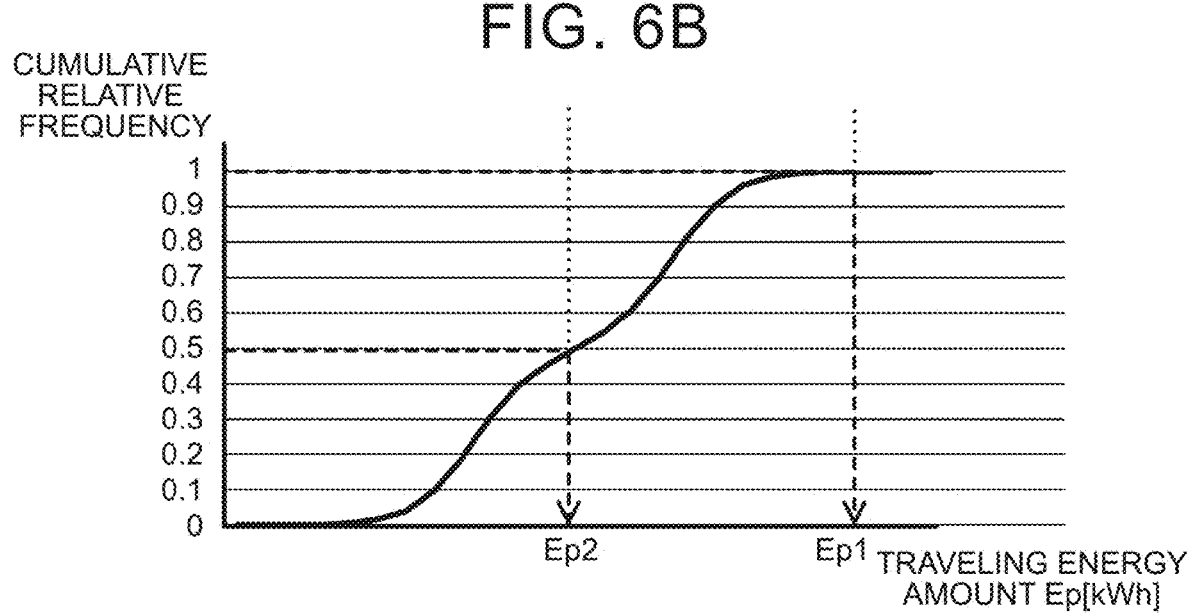
FIG. 6B is a diagram illustrating a cumulative relative frequency distribution of the data on the traveling energy amounts Ep for the preheating time from the point A.

FIG. 6A is a diagram illustrating a frequency distribution of data on the traveling energy amounts Ep for the preheating time from the point A in the vehicles 2 having passed the point A. The traveling energy amount Ep is calculated based on the traveling record information of each vehicle 2. FIG. 6B is a diagram illustrating a cumulative relative frequency distribution of the data on the traveling energy amounts Ep.

As described above with reference to FIG. 4 and FIG. 5, the traveling records from the point A are roughly classified into the traveling records "a" and "b" showing a relatively small traveling energy amount Ep for the preheating time from the point A, and the traveling records "c" and "d"

showing a relatively large traveling energy amount Ep for the preheating time from the point A. As illustrated in FIG. 6A, the frequency distribution chart of the data on the traveling energy amounts Ep for the preheating time from the point A in the vehicles 2 having passed the point A shows a frequency distribution having two peaks on the side where the traveling energy amount Ep is relatively small and on the side where the traveling energy amount Ep is relatively large.

As illustrated in FIG. 6B, the following information can easily be obtained by organizing, as the cumulative relative frequency distribution, the data on the traveling energy amounts Ep for the preheating time from the point A in the vehicles 2 having passed the point A.

In FIG. 6B, a symbol "Ep1" represents a traveling energy amount at a cumulative relative frequency of 1. The fact that the cumulative relative frequency is 1 means that the ratio of vehicles 2 that can travel for the preheating time T from the point A with traveling energy amounts equal to or smaller than the traveling energy amount Ep1 is 1 among the vehicles 2 having passed the point A. That is, among the vehicles 2 having passed the point A, all the vehicles 2 travel for the preheating time T from the point A with traveling energy amounts equal to or smaller than the traveling energy amount Ep1.

A symbol "Ep2" represents a traveling energy amount at a cumulative relative frequency of 0.5. The fact that the cumulative relative frequency is 0.5 means that the ratio of vehicles 2 that can travel for the preheating time T from the point A with traveling energy amounts equal to or smaller than the traveling energy amount Ep2 is 0.5 among the vehicles 2 having passed the point A. That is, among the vehicles 2 having passed the point A, half of the vehicles 2 travel for the preheating time T from the point A with traveling energy amounts equal to or smaller than the traveling energy amount Ep2.

If the traveling energy amount Ep1 at the cumulative relative frequency of 1 is substituted into Expression (1) to set the warming start charge amount SOC2 and the preheating is started from the point A, all the vehicles 2 having passed the point A are successful in the preheating because the warm-up of the catalyst device 15 is completed before the battery charge amount SOC decreases from the warming start charge amount SOC2 to the mode switching charge amount SOC1.

If the traveling energy amount Ep2 at the cumulative relative frequency of 0.5 is substituted into Expression (1) to set the warming start charge amount SOC2 and the preheating is started from the point A, half of the vehicles 2 having passed the point A are successful in the preheating because the warm-up of the catalyst device 15 is completed before the battery charge amount SOC decreases from the warming start charge amount SOC2 to the mode switching charge amount SOC1.

As described above, the data on the traveling energy amounts Ep for the preheating time from the certain point in the vehicles 2 having passed the certain point is organized as the cumulative relative frequency distribution. When a traveling energy amount Ep($\alpha$) at a cumulative relative frequency $\alpha$ is substituted into Expression (1) to set the warming start charge amount SOC2 and the preheating is started from the certain point, the preheating is successful at a ratio of approximately "a".

In this embodiment, traveling energy amounts Ep for the preheating time from individual points on roads are calculated based on pieces of traveling record information transmitted from the individual vehicles 2, and a data structure is generated by organizing, as cumulative relative frequency distributions, data on the traveling energy amounts Ep for the individual points.

When reference is made to the data structure and the preheating is started from a certain point on a road, a predicted value of the traveling energy amount Ep at which a preheating-success probability is equal to or higher than a predetermined probability (hereinafter referred to as "predicted traveling energy amount Epest") can be calculated. Specifically, to determine a predicted traveling energy amount Epest for the preheating time from a certain point on a road, reference is made to the data structure in which the data on the traveling energy amounts Ep for the preheating time from the point is organized as the cumulative relative frequency distribution, and a traveling energy amount Ep at which the preheating-success probability is a predetermined probability $\alpha$s ($0 \leq \alpha s \leq 1$), that is, a traveling energy amount Ep(as) at which the cumulative relative frequency $\alpha$ is a predetermined cumulative relative frequency $\alpha$s is calculated as the predicted traveling energy amount Epest.

When the cumulative relative frequency $\alpha$s is set to, for example, a value close to 1, the warm-up of the catalyst device 15 can be completed, with a high probability, before the battery charge amount SOC decreases from the warming start charge amount SOC2 to the mode switching charge amount SOC1. When the cumulative relative frequency $\alpha$s is, for example, made closer to 0 from 1, it is possible to suppress an excessive increase in the length of time from completion of the warm-up of the catalyst device 15 to the decrease in the battery charge amount SOC to the mode switching charge amount SOC1.

By setting the value of the cumulative relative frequency $\alpha$s to an appropriate value within a range of 0 to 1, it is possible to suppress, while securing the preheating-success probability, an increase in the length of time from completion of the warm-up of the catalyst device 15 to the decrease in the battery charge amount SOC to the mode switching charge amount SOC1. In this embodiment, the cumulative relative frequency $\alpha$s is a fixed value, but may be a variable depending on, for example, a profile of the frequency distribution chart of FIG. 6A.

Figure 7:
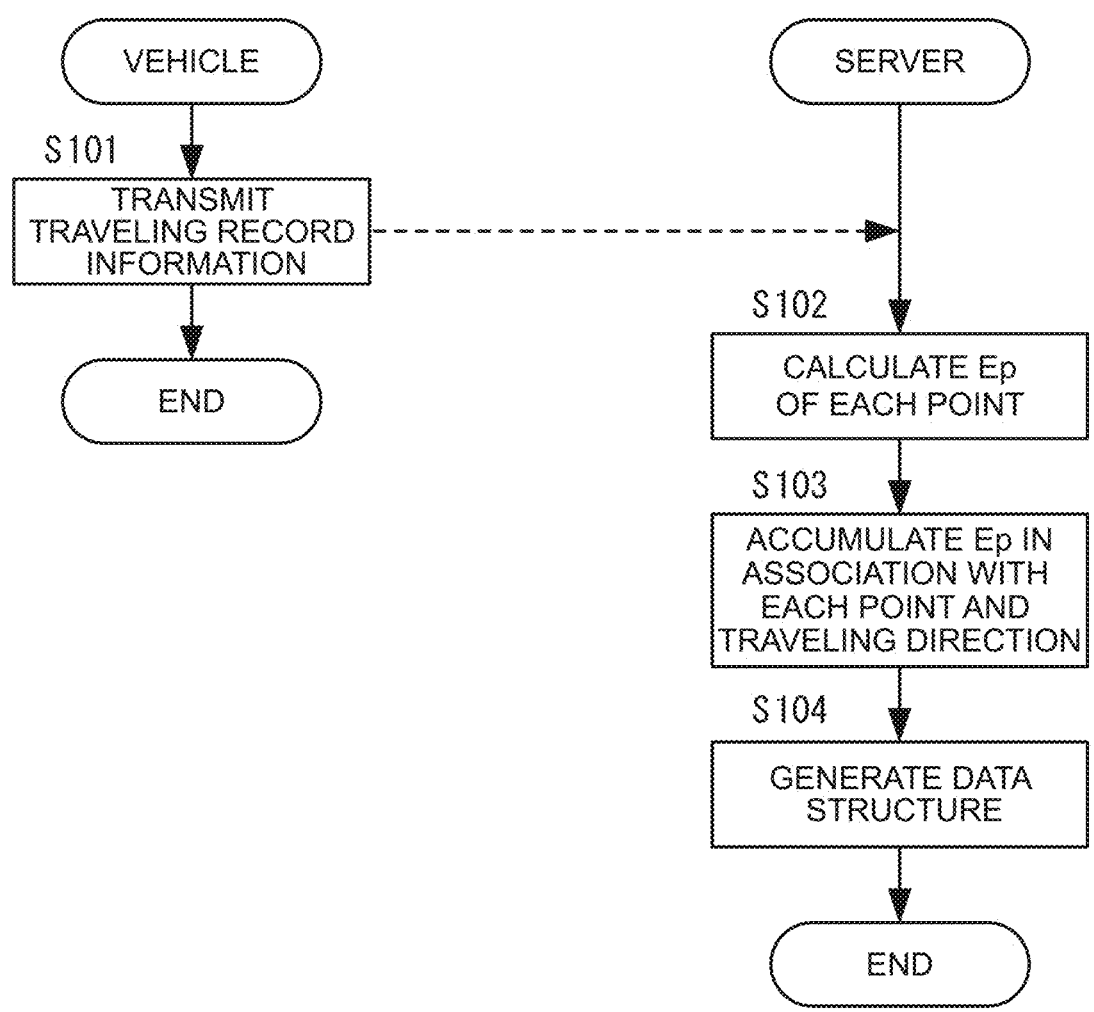
FIG. 7 is a flowchart illustrating a data structure generation process according to a first embodiment of the present disclosure.

FIG. 7 is a flowchart illustrating a process to be executed in the server 3 (data structure generation process) when pieces of traveling record information are transmitted from the vehicles 2 (driver's vehicle 2a and other vehicles 2b). FIG. 7 illustrates an example in which traveling record information is transmitted from the driver's vehicle 2a.

In Step S101, the electronic control unit 200 transmits traveling record information of the driver's vehicle 2a, that is, time-series data of pieces of positional information (longitudes and latitudes) and traveling loads Pp of the driver's vehicle 2a to the server 3 at a predetermined timing. The predetermined timing may be every constant period or an end time of one trip.

Figure 8A:
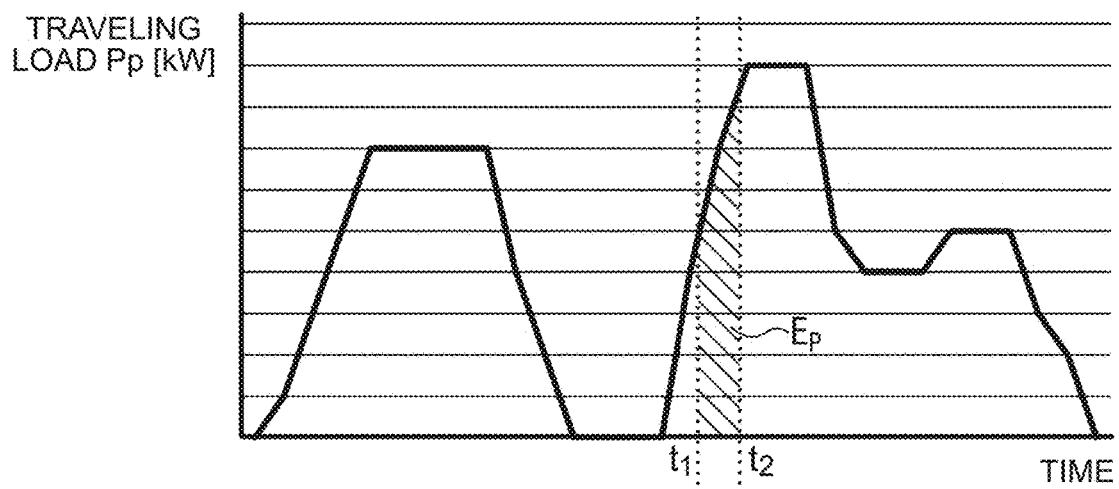
FIG. 8A is a diagram illustrating an example of a method for calculating a traveling energy amount for the preheating time from a certain point.
Figure 8B:
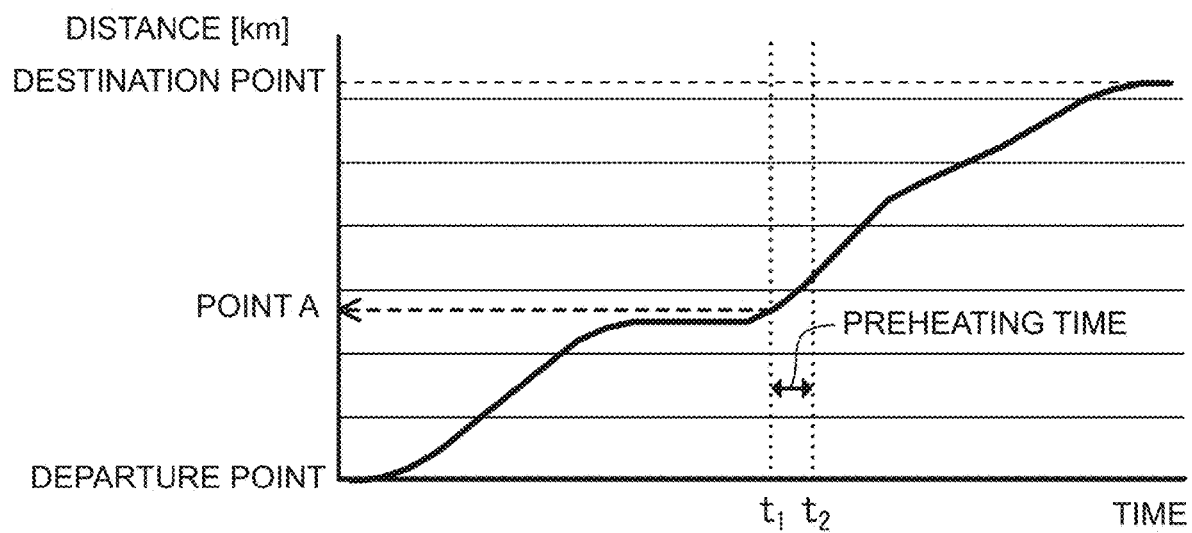
FIG. 8B is a diagram illustrating the example of the method for calculating the traveling energy amount for the preheating time from the certain point.

In Step S102, the server 3 calculates, based on the received traveling record information, traveling directions of the driver's vehicle 2a and traveling energy amounts Ep for the preheating time from individual points where the pieces of positional information are acquired. As illustrated in FIG. 8A and FIG. 8B, the server 3 can grasp a traveling load Pp at each time and positional information at each time from the received traveling record information. For example, a traveling energy amount Ep for the preheating time from the point A at a time t1 in FIG. 8B can be calculated as the area of a hatched zone in FIG. 8A.

In Step S103, the server 3 accumulates data on the traveling energy amounts Ep for the preheating time from the individual points that are calculated in Step S102 in association with the individual points and the individual vehicle traveling directions.

In Step S104, the server 3 generates a data structure by organizing, in association with the individual points and the individual vehicle traveling directions as cumulative relative frequency distributions, the data on the traveling energy amounts Ep for the preheating time that is accumulated in association with the individual points and the individual vehicle traveling directions. The generated data structure includes the pieces of positional information and the cumulative relative frequency distributions associated with the individual vehicle traveling directions and related to the data on the traveling energy amounts (traveling load amounts) depending on a traveling time from the points indicated by the pieces of positional information for the vehicles 2 having traveled through the points.

In this embodiment, the traveling energy amounts Ep for the predetermined time (preheating time) from the individual points are calculated, but the present disclosure is not limited to this case. The server 3 may generate a data structure by calculating traveling energy amounts Ep for a predetermined distance from the individual points and organizing the traveling energy amounts Ep as cumulative relative frequency distributions.

FIG. 9 is a flowchart illustrating catalyst warming control in the driver's vehicle 2a according to this embodiment. The electronic control unit 200 repeatedly executes this routine in every predetermined calculation period (for example, 10 [ms]).

In Step S1, the electronic control unit 200 determines whether a catalyst warming start flag F1 is set to 0. The catalyst warming start flag F1 is set to 1 when the warm-up of the catalyst device 15 is started, and an initial value is set to 0. When the catalyst warming start flag F1 is 0, the electronic control unit 200 proceeds to a process of Step S2. When the catalyst warming start flag F1 is 1, the electronic control unit 200 proceeds to a process of Step S7.

Figure 10:
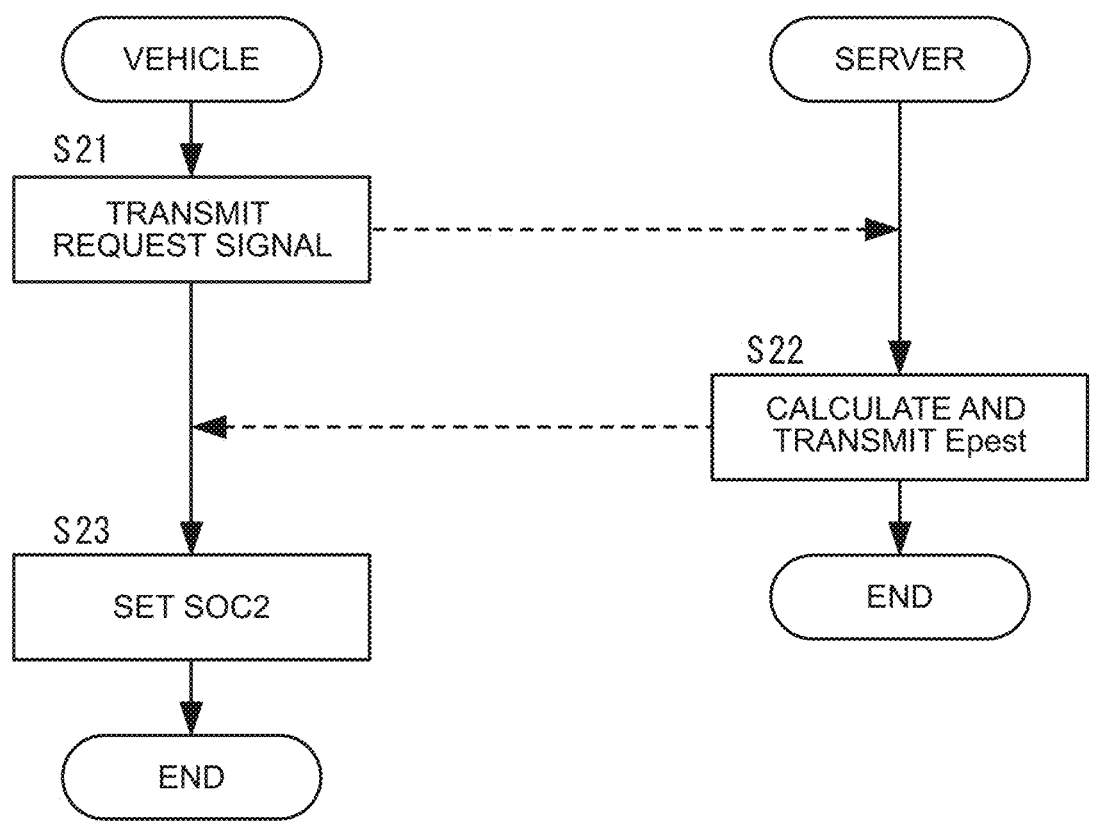
FIG. 10 is a flowchart illustrating details of a warming start charge amount setting process according to the first embodiment of the present disclosure.

In Step S2, the electronic control unit 200 executes a warming start charge amount setting process for setting a warming start charge amount SOC2. Details of the warming start charge amount setting process are described with reference to FIG. 10.

In Step S21, the electronic control unit 200 transmits a request signal for a predicted traveling energy amount Epest for the preheating time from a current position of the driver's vehicle 2a to the server 3 together with information related to the current position and a traveling direction of the driver's vehicle 2a.

In Step S22, the server 3 refers to the data structure in which a distribution of the traveling energy amounts Ep for the preheating time from the current position of the driver's vehicle 2a is organized as a cumulative relative frequency distribution in association with the individual vehicle traveling directions, calculates a traveling energy amount Ep at the cumulative relative frequency $\alpha s$ as the predicted traveling energy amount Epest, and transmits the predicted traveling energy amount Epest to the vehicle 2 that has transmitted the request signal (in this example, the driver's vehicle 2a).

In Step S23, the electronic control unit 200 sets the warming start charge amount SOC2 by substituting the predicted traveling energy amount Epest as the energy amount Eh of Expression (1).

Referring back to FIG. 9, the electronic control unit 200 determines in Step S3 whether the battery charge amount SOC is smaller than the warming start charge amount SOC2. When the battery charge amount SOC is smaller than the warming start charge amount SOC2, the electronic control unit 200 proceeds to a process of Step S4. When the battery charge amount SOC is equal to or larger than the warming start charge amount SOC2, the electronic control unit 200 terminates the current process.

In Step S4, the electronic control unit 200 determines whether the catalyst bed temperature TEHC is lower than the activation start temperature TEHC1. When the catalyst bed temperature TEHC is lower than the activation start temperature TEHC1, the electronic control unit 200 proceeds to a process of Step S5. When the catalyst bed temperature TEHC is equal to or higher than the activation start temperature TEHC1, the electronic control unit 200 terminates the current process because the exhaust gas control function of the catalyst starts to work. The catalyst bed temperature TEHC may be detected by a temperature sensor, or may be estimated by various known estimation methods such as estimation based on a temperature of a coolant that cools the engine body 11.

In Step S5, the electronic control unit 200 starts energization of the conductive substrate 151 to warm the catalyst device 15. In this embodiment, the electronic control unit 200 starts the warm-up of the catalyst device 15 by controlling the voltage regulation circuit 153 so that the substrate-supply power Ph is the constant rated power.

In Step S6, the electronic control unit 200 sets the catalyst warming start flag F1 to 1.

In Step S7, the electronic control unit 200 determines whether the catalyst bed temperature TEHC is equal to or higher than the active temperature TEHC2. In this embodiment, when the time from the start of the warm-up of the catalyst device 15 is equal to or longer than the preheating time T, the electronic control unit 200 determines that the catalyst bed temperature TEHC is equal to or higher than the active temperature TEHC2, and proceeds to a process of Step S8. When the catalyst bed temperature TEHC is lower than the active temperature TEHC2, the electronic control unit 200 terminates the current process.

In Step S8, the electronic control unit 200 stops the energization of the conductive substrate 151 to terminate the warm-up of the catalyst device 15.

In Step S9, the electronic control unit 200 resets the catalyst warming start flag F1 to 0.

The data structure according to this embodiment is used in the server 3 (information processing device) in the vehicle control system 1. The data structure includes pieces of positional information and pieces of cumulative relative frequency distribution information associated with individual vehicle traveling directions and related to data on traveling energy amounts (traveling load amounts) depending on a traveling time or a traveling distance from points indicated by the pieces of positional information for the vehicles 2 having traveled through the points. The data structure according to this embodiment is used in the server 3 for the process of calculating a predicted traveling energy amount (predicted value of traveling load amount) depending on the traveling time or the traveling distance from an arbitrary point based on a traveling direction of the vehicle 2 and cumulative relative frequency distribution information at the arbitrary point.

Thus, the data structure according to this embodiment includes the pieces of cumulative relative frequency distribution information related to the data on the traveling energy amounts for the traveling time or the traveling distance from individual points on roads for the vehicles 2 having passed the individual points on the roads. By referring to this data structure, a predicted traveling energy amount for the traveling time or the traveling distance from an arbitrary point can be calculated accurately.

The data structure according to this embodiment is used in the server 3 for the process of, when a request signal containing a current position and a traveling direction of a vehicle is received from the vehicle, calculating a predicted traveling energy amount depending on the traveling time or the traveling distance from the current position of the vehicle based on cumulative relative frequency distribution information associated with individual vehicle traveling directions at the current position of the vehicle, and transmitting the predicted traveling energy amount to the vehicle that has transmitted the request signal.

According to this embodiment, the vehicle 2 in the vehicle control system 1 includes the internal combustion engine 10, the electrically-heated catalyst device 15 provided in the exhaust passage 14 of the internal combustion engine 10 and to be heated through energization, and the chargeable and dischargeable battery 50. The electronic control unit 200 (vehicle control device) configured to control the vehicle 2 controls the vehicle 2 based on a predicted traveling energy amount calculated by using the data structure. Specifically, the electronic control unit 200 sets a target value of the battery charge amount SOC at which the energization of the conductive substrate 151 is started based on a predicted traveling energy amount depending on the traveling time or the traveling distance from a current position of the vehicle 2.

Thus, the warming start charge amount SOC2 can be set by accurately estimating the traveling energy amount necessary to complete electrically heating the catalyst device 15 (preheating). Therefore, it is possible to suppress a decrease in the battery charge amount SOC to the mode switching charge amount SOC1 before the preheating is completed, or to suppress an excessive increase in the length of time from completion of the preheating to the decrease in the battery charge amount SOC to the mode switching charge amount SOC1.

The data structure according to this embodiment for use in the server 3 (information processing device) in the vehicle control system 1 is generated by acquiring time-series data of pieces of positional information and traveling loads at individual points where the vehicles have traveled, calculating, based on the time-series data, traveling directions of the vehicles from which the time-series data is acquired, and traveling load amounts of the vehicles depending on the traveling time or the traveling distance from the individual points where the pieces of positional information are acquired, accumulating data on the calculated traveling load amounts depending on the traveling time or the traveling distance from the individual points in association with the individual points and the individual traveling directions, and creating, in association with the individual points and the individual traveling directions, cumulative relative frequency distributions of the traveling load amounts depending on the traveling time or the traveling distance from the individual points based on the data on the traveling load amounts that is accumulated in association with the individual points and the individual traveling directions.

A method for generating the data structure according to this embodiment by the server 3 (information processing device) in the vehicle control system 1 includes a first step of acquiring time-series data of pieces of positional information and traveling loads at individual points where the vehicles have traveled, a second step of calculating, based on the time-series data, traveling directions of the vehicles from which the time-series data is acquired, and traveling load amounts of the vehicles depending on the traveling time or the traveling distance from the individual points where the pieces of positional information are acquired, a third step of accumulating, in association with the individual points and the individual traveling directions, data on the traveling load amounts depending on the traveling time or the traveling distance from the individual points that are calculated in the second step, and a fourth step of creating, in association with the individual points and the individual traveling directions, cumulative relative frequency distributions of the traveling load amounts depending on the traveling time or the traveling distance from the individual points based on the data on the traveling load amounts that is accumulated in association with the individual points and the individual traveling directions.

Second Embodiment

Next, a second embodiment of the present disclosure is described. This embodiment differs from the first embodiment in that a time lag from transmission of a request signal to reception of a predicted traveling energy amount Epest is taken into consideration. This difference is mainly described below.

In the first embodiment, the driver's vehicle 2*a* transmits information on a current position of the driver's vehicle 2*a* to the server 3 together with a request signal, and a predicted traveling energy amount Epest for the preheating time from the current position of the driver's vehicle 2*a* is acquired via the server 3.

Figure 11:
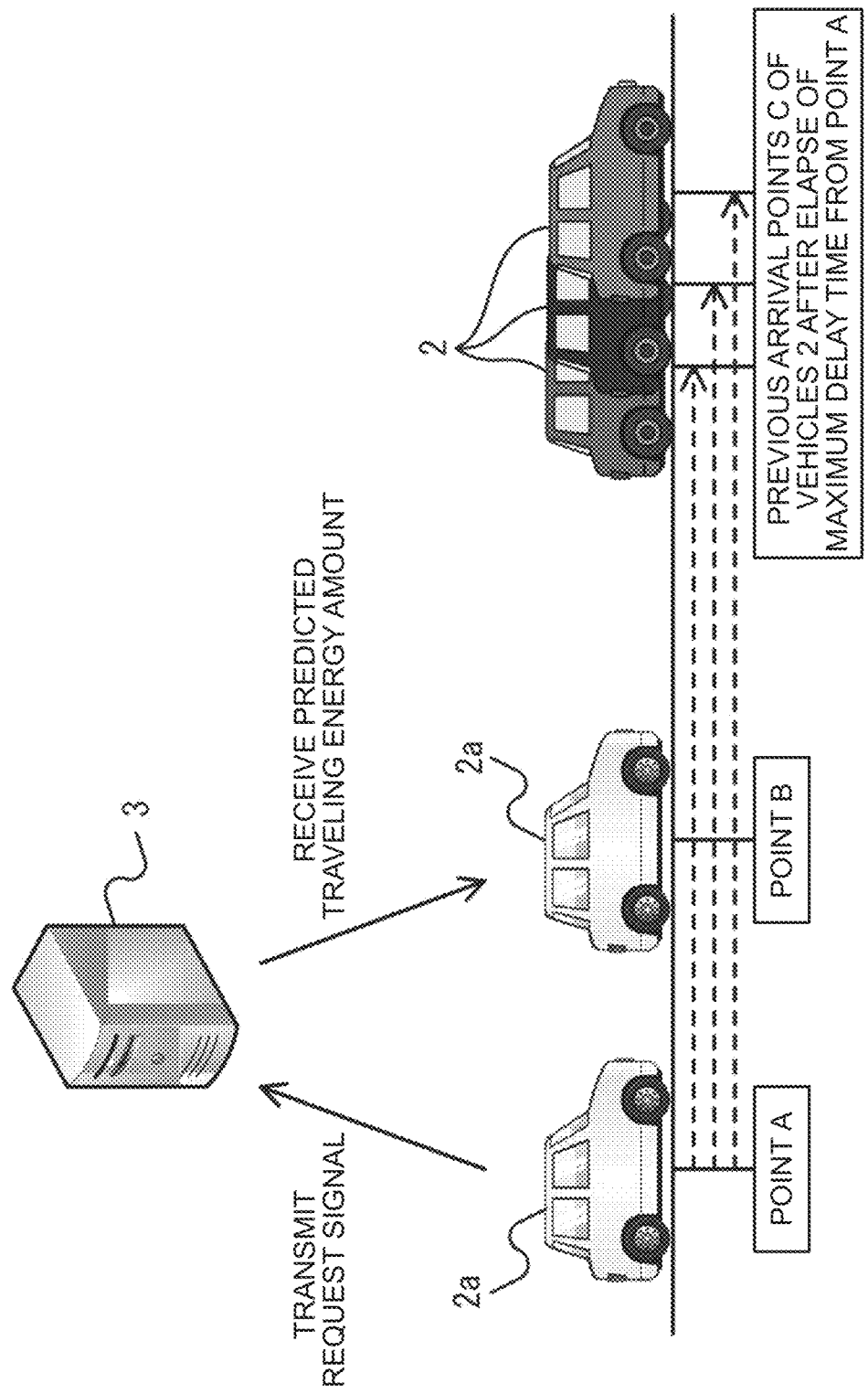
FIG. 11 is a diagram for describing that a time lag occurs due to a communication delay from transmission of a request signal to reception of a predicted traveling energy amount.

Therefore, a time lag occurs due to a communication delay from the transmission of the request signal to the reception of the predicted traveling energy amount Epest. As illustrated in FIG. 11, the driver's vehicle 2*a* may travel in a period from the transmission of the request signal to the reception of the predicted traveling energy amount Epest, and a point A where the request signal is transmitted may differ from a point B where the predicted traveling energy amount Epest is received.

In this case, a predicted traveling energy amount Epest for the preheating time from the point B is necessary to appropriately set the warming start charge amount SOC2. In the first embodiment, however, the data received from the server 3 is a predicted traveling energy amount Epest for the preheating time from the point A.

In this embodiment, the predicted traveling energy amount Epest for the preheating time from the point B is estimated through linear interpolation. Description is given of a method for estimating the predicted traveling energy amount Epest through the linear interpolation in consideration of the time lag.

To estimate the predicted traveling energy amount Epest for the preheating time from the point B through the linear interpolation, it is necessary to acquire predicted traveling energy amounts Epest for the preheating time from two points other than the point B.

In this embodiment, a predicted traveling energy amount Epest for the preheating time from the point A where the request signal is transmitted (see FIG. 11) is first calculated similarly to the first embodiment. In this embodiment, the predicted traveling energy amount Epest for the preheating time from the point A where the request signal is transmitted is referred to as "first predicted traveling energy amount Epest1" for convenience.

Next, arrival points C (see FIG. 11) where the vehicles 2 were traveling after an elapse of a possible maximum time of the time lag (hereinafter referred to as "maximum delay time") from the point A where request signals were transmitted are extracted based on pieces of previous traveling record information of the vehicles 2. Then, a data structure is generated by compiling data on traveling energy amounts Ep for the preheating time from the arrival points C and organizing the data as cumulative relative frequency distributions. By referring to the data structure, a traveling energy amount Ep when the cumulative relative frequency a is the predetermined cumulative relative frequency $\alpha s$ is calculated as a predicted traveling energy amount Epest2 for the preheating time from the arrival points C after the elapse of the maximum delay time (hereinafter referred to as "second predicted traveling energy amount").

Figure 12:
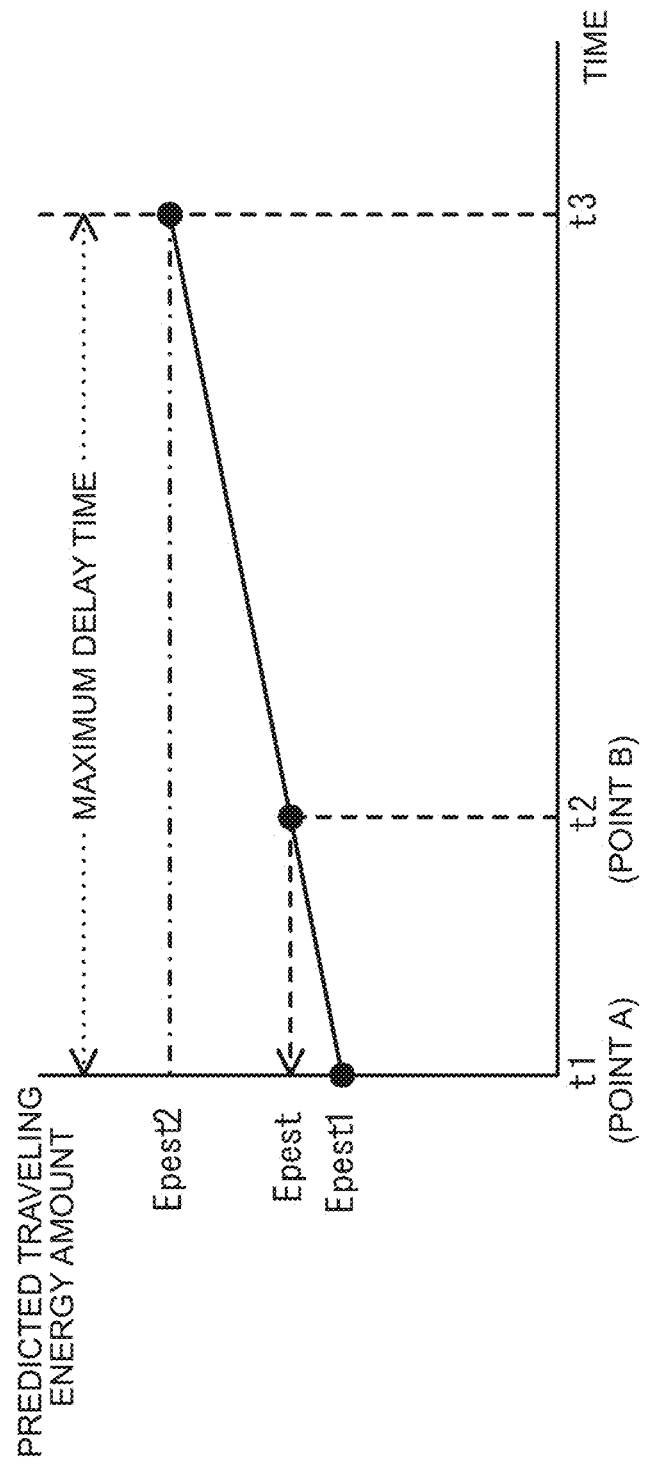
FIG. 12 is a diagram illustrating linear interpolation.

As illustrated in FIG. 12, t1 represents a time when the request signal is transmitted, t2 represents a time when a response to the request signal is received, and t3 represents a time after the elapse of the maximum delay time from the time t1. The predicted traveling energy amount Epest for the preheating time from the time t2 (point B) is estimated through linear interpolation using the first predicted traveling energy amount Epest1 for the preheating time from the time t1 (point A) and the second predicted traveling energy amount Epest2 for the preheating time from the time t3 (arrival point C).

Figure 13:
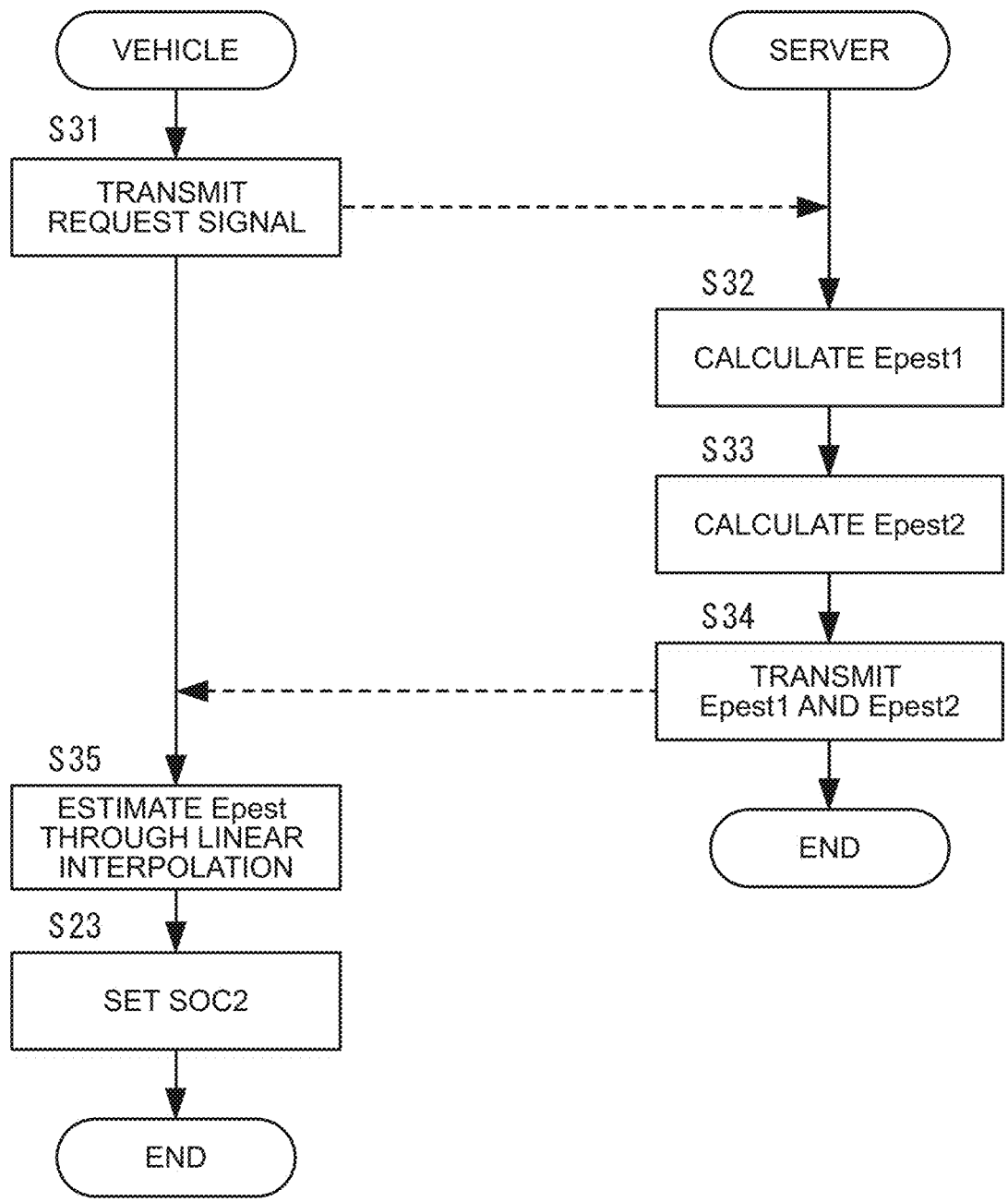
FIG. 13 is a flowchart illustrating details of a warming start charge amount setting process according to a second embodiment of the present disclosure.

FIG. 13 is a flowchart illustrating details of a warming start charge amount setting process according to this embodiment. In FIG. 13, a process of Step S23 is similar to that of the first embodiment, and its description is omitted.

In Step S31, the electronic control unit 200 transmits a request signal for a first predicted traveling energy amount Epest1 and a second predicted traveling energy amount Epes2 to the server together with information related to a current position and a traveling direction of the driver's vehicle 2a. In this embodiment, the request signal contains a transmission time t1.

In Step S32, the server 3 refers to a data structure in which data on traveling energy amounts Ep for the preheating time from the current position of the driver's vehicle 2a is organized as a cumulative relative frequency distribution, and calculates, as the first predicted traveling energy amount Epest1, a traveling energy amount Ep when the cumulative relative frequency $\alpha$ is the predetermined value as.

In Step S33, the server 3 extracts, based on pieces of previous traveling record information of the vehicles 2, arrival points C of the vehicles 2 after an elapse of the maximum delay time from the transmission time t1 of the request signal. Then, the server 3 generates a data structure by compiling data on the traveling energy amounts Ep for the preheating time from the arrival points C and organizing the data as cumulative relative frequency distributions. Then, the server 3 refers to the data structure, and calculates, as the second predicted traveling energy amount Epest2, a traveling energy amount Ep when the cumulative relative frequency $\alpha$ is the predetermined cumulative relative frequency $\alpha s$.

In Step S34, the server 3 transmits the first predicted traveling energy amount Epest1 and the second predicted traveling energy amount Epest2 to the driver's vehicle 2a that has transmitted the request signal.

In Step S35, the driver's vehicle 2a estimates a predicted traveling energy amount Epest for the preheating time from a current position of the driver's vehicle 2a at a reception time t2 of the first predicted traveling energy amount Epest1 and the second predicted traveling energy amount Epest2 through linear interpolation using the first predicted traveling energy amount Epest1, the second predicted traveling energy amount Epest2, and the reception time t2.

The data structure according to this embodiment is used in the server 3 (information processing device) in the vehicle control system 1. The data structure includes pieces of positional information, pieces of first cumulative relative frequency distribution information associated with individual vehicle traveling directions and related to data on traveling energy amounts (traveling load amounts) depending on a traveling time or a traveling distance from points indicated by the pieces of positional information for the vehicles 2 having traveled through the points, and pieces of second cumulative relative frequency distribution information associated with individual vehicle traveling directions and related to data on traveling load amounts depending on the traveling time or the traveling distance from points where the vehicles 2 having traveled through the points indicated by the pieces of positional information travel after an elapse of a predetermined maximum communication delay time from the points.

The data structure is used in the server 3 for the process of, when a request signal containing a current position and a traveling direction of a vehicle is received from the vehicle, calculating a first predicted traveling energy amount Epest1 (predicted value of first traveling load amount) depending on the traveling time or the traveling distance from the current position of the vehicle based on first cumulative relative frequency distribution information associated with individual vehicle traveling directions at the current position of the vehicle, calculating a second predicted traveling energy amount Epest2 (predicted value of second traveling load amount) depending on the traveling time or the traveling distance from a point where the vehicle is expected to travel after an elapse of the maximum communication delay time based on second cumulative relative frequency distribution information associated with individual vehicle traveling directions at the current position of the vehicle, and transmitting the first predicted traveling energy amount Epest1 and the second predicted traveling energy amount Epest2 to the vehicle 2 that has transmitted the request signal.

According to this embodiment, the electronic control unit 200 (vehicle control device) configured to control the vehicle 2 in the vehicle control system 1 calculates, based on the first predicted traveling energy amount Epest1 and the second predicted traveling energy amount Epest2 calculated by using the data structure according to this embodiment, a traveling load amount depending on the traveling time or the traveling distance from an arbitrary point between the current position of the vehicle 2 and the point where the vehicle 2 is expected to travel after the elapse of the maximum communication delay time.

More specifically, the electronic control unit 200 calculates, through linear interpolation using the first predicted traveling energy amount Epest1 and the second predicted traveling energy amount Epest2, the traveling load amount depending on the traveling time or the traveling distance from the arbitrary point between the current position of the vehicle 2 and the point where the vehicle 2 is expected to travel after the elapse of the maximum communication delay time.

Thus, it is possible to accurately estimate the traveling energy amount depending on the traveling time or the traveling distance from the point where the vehicle 2 receives the predicted traveling energy amount.

Third Embodiment

Next, a third embodiment of the present disclosure is described. This embodiment differs from the embodiments described above in that the data on the traveling energy amounts Ep managed in association with the individual points is also managed in association with a zone including a plurality of points. This difference is mainly described below.

In the first embodiment, a data structure is generated by organizing data on traveling energy amounts Ep for the preheating time from each point on a road as a cumulative relative frequency distribution in association with individual vehicle traveling directions, and the data structure is managed in association with each point.

A deviation may occur between an actual traveling point of the driver's vehicle 2a and a point detected by the GPS receiver 96. When the deviation occurs, the predicted traveling energy amount Ep is calculated by referring to a data structure in which data on traveling energy amounts Ep for the preheating time from the detected point different from the actual traveling point is organized as a cumulative relative frequency distribution. Then, the warming start charge amount SOC2 cannot be set to an appropriate value. Therefore, the battery charge amount SOC may decrease to the mode switching charge amount SOC1 before the warm-up of the catalyst device 15 is completed, or the length of time may excessively increase from completion of the warm-up of the catalyst device 15 to the decrease in the battery charge amount SOC to the mode switching charge amount SOC1.

In this embodiment, at the point where the deviation is likely to occur, the data on the traveling energy amounts Ep is not managed in association with each point, but is managed in association with a zone including a plurality of points. Then, a data structure is generated by organizing data on traveling energy amounts Ep for the preheating time from the zone as a cumulative relative frequency distribution.

Figure 14:
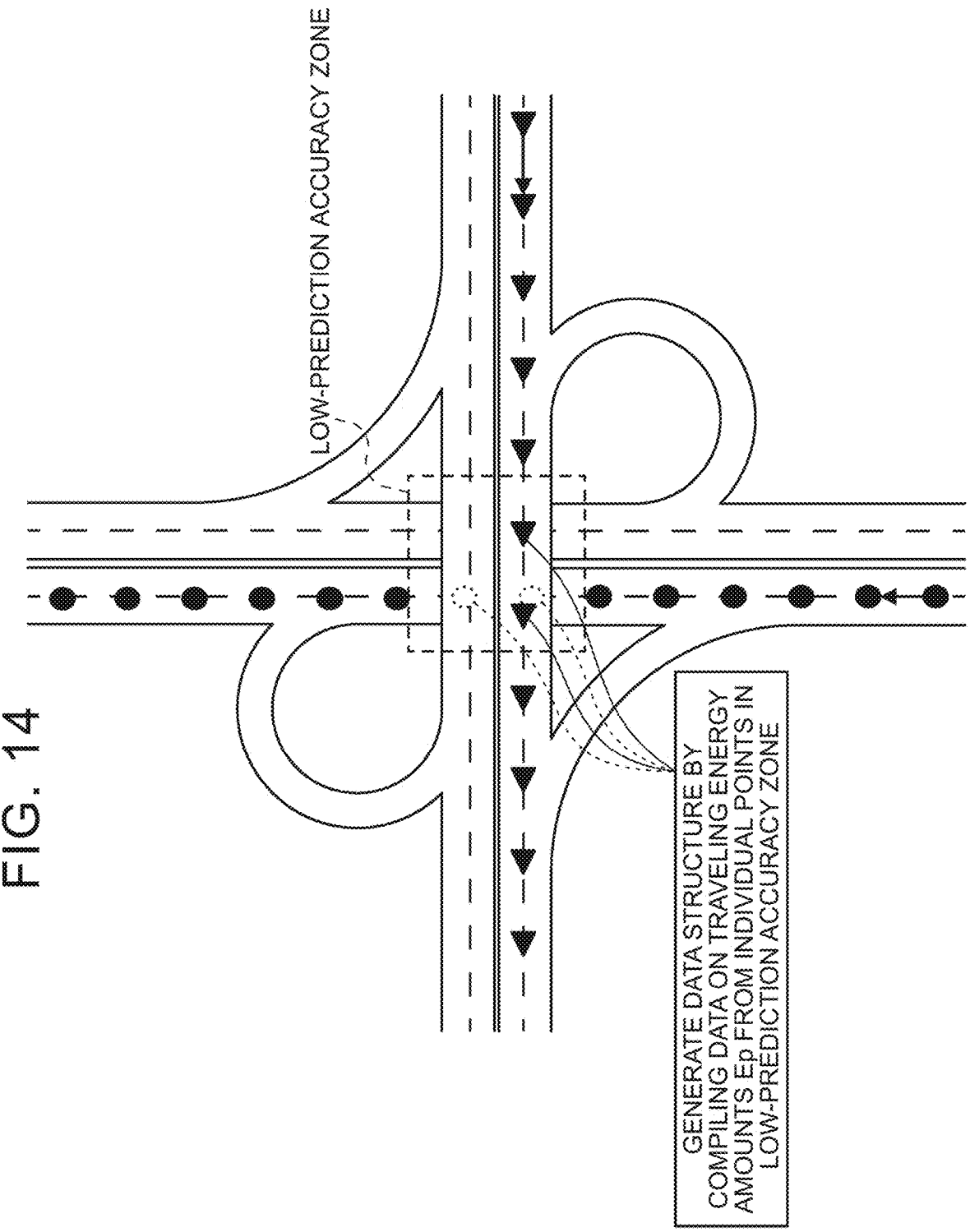
FIG. 14 is a diagram illustrating a low-prediction accuracy zone.

In this embodiment, the deviation between the traveling point of the driver's vehicle 2a and the point detected by the GPS receiver 96 is likely to occur on, for example, roads with grade separation, neighboring roads with difference in height, and branching roads with difference in height to a predetermined degree or more, one of which is an upward slope and the other of which is a downward slope. For example, as illustrated in FIG. 14, a predetermined zone including a plurality of points on the roads where the deviation is likely to occur is prestored in the server 3 as a low-prediction accuracy zone. In FIG. 14, circles and triangles represent the individual points on the roads.

Figure 15:
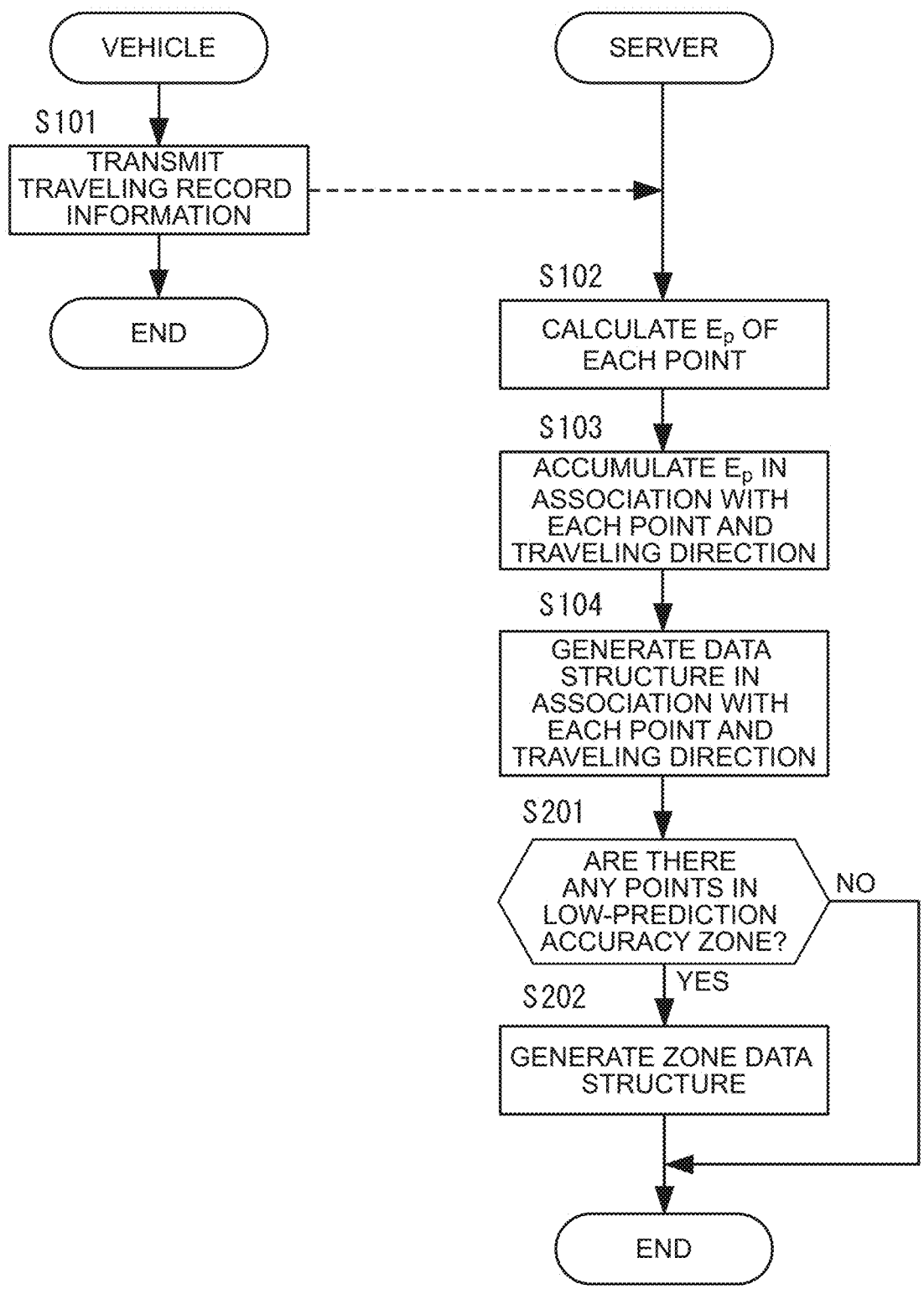
FIG. 15 is a flowchart illustrating a data structure generation process according to a third embodiment of the present disclosure.

FIG. 15 is a flowchart illustrating a process to be executed in the server 3 according to this embodiment (data structure generation process) when pieces of traveling record information are transmitted from the vehicles 2 (driver's vehicle 2a and other vehicles 2b). In FIG. 15, processes of Step S101 to Step S104 are similar to those of the first embodiment, and their description is omitted.

In Step S201, the server 3 determines whether the points where the pieces of positional information are acquired include points in a low-prediction accuracy zone. When the points where the pieces of positional information are acquired do not include the points in the low-prediction accuracy zone, the server 3 terminates the process. When the points where the pieces of positional information are acquired include the points in the low-prediction accuracy zone, the server 3 proceeds to a process of Step S202.

In Step S202, the server 3 generates a data structure (hereinafter referred to as "zone data structure") by compiling data on traveling energy amounts Ep for the preheating time from the individual points in the low-prediction accuracy zone that is accumulated in association with the individual points and the individual vehicle traveling directions, and organizing the compiled data as a cumulative relative frequency distribution.

Figure 16:
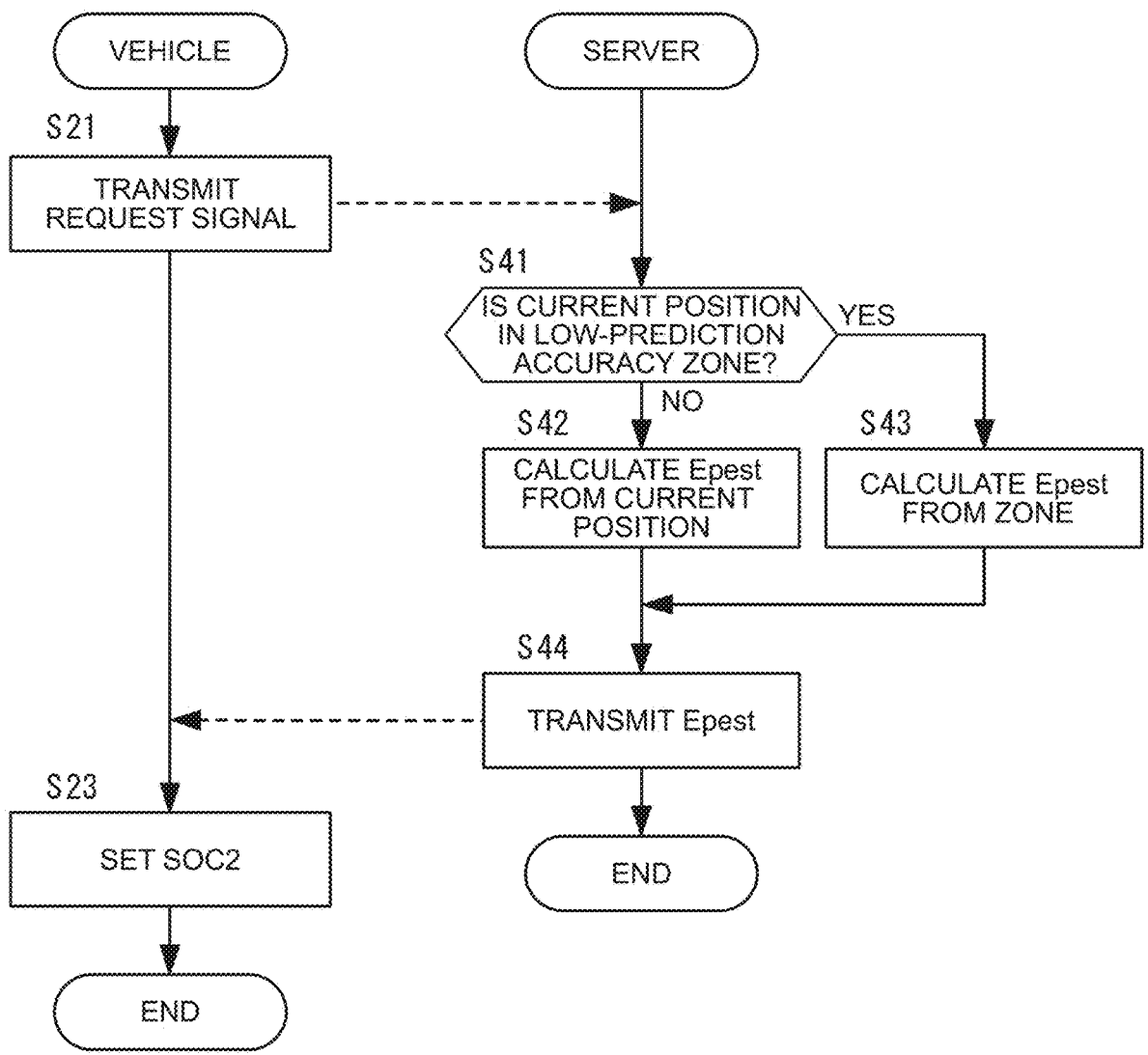
FIG. 16 is a flowchart illustrating details of a warming start charge amount setting process according to the third embodiment of the present disclosure.

FIG. 16 is a flowchart illustrating details of a warming start charge amount setting process according to this embodiment. In FIG. 16, processes of Step S21 and Step S23 are similar to those of the first embodiment, and their description is omitted.

In Step S41, the server 3 determines whether a current position of the driver's vehicle 2a is in the low-prediction accuracy zone. When the current position of the driver's vehicle 2a is not in the low-prediction accuracy zone, the server 3 proceeds to a process of Step S42. When the current position of the driver's vehicle 2a is in the low-prediction accuracy zone, the server 3 proceeds to a process of Step S43.

In Step S42, the server 3 refers to the data structure in which data on traveling energy amounts Ep for the preheating time from the current position of the driver's vehicle 2a is organized as a cumulative relative frequency distribution, and calculates, as the predicted traveling energy amount Epest, a traveling energy amount Ep when the cumulative relative frequency a is the predetermined cumulative relative frequency αs.

In Step S43, the server 3 refers to the zone data structure in which the data on the traveling energy amounts Ep for the preheating time from the low-prediction accuracy zone where the driver's vehicle 2a is present is organized as the cumulative relative frequency distribution, and calculates, as the predicted traveling energy amount Epest, a traveling energy amount Ep when the cumulative relative frequency α is the predetermined cumulative relative frequency αs.

In the low-prediction accuracy zone, the predicted traveling energy amount Epest is calculated based on the zone data structure in which the data obtained by compiling the traveling energy amounts at the individual points in the zone is organized as the cumulative relative frequency distribution. Therefore, it is possible to suppress a significant deviation of the predicted traveling energy amount Epest even if the actual traveling point of the driver's vehicle 2a and the point detected by the GPS receiver 96 deviate from each other in the low-prediction accuracy zone. When the actual traveling point of the driver's vehicle 2a and the point detected by the GPS receiver 96 do not deviate from each other in the low-prediction accuracy zone, the accuracy of prediction of the traveling energy amount decreases to some degree as compared to the accuracy of the predicted traveling energy amount Epest calculated by referring to the data structure in which the data on the traveling energy amounts Ep for the preheating time from the individual points is organized as the cumulative relative frequency distributions.

In Step S44, the server 3 transmits the calculated predicted traveling energy amount Epest to the vehicle 2 that has transmitted the request signal (in this example, the driver's vehicle 2a).

The data structure according to this embodiment is used in the server 3 (information processing device) in the vehicle control system 1. The data structure includes pieces of positional information, pieces of first cumulative relative frequency distribution information associated with individual vehicle traveling directions and related to data on traveling energy amounts (traveling load amounts) depending on a traveling time or a traveling distance from points indicated by the pieces of positional information for the vehicles 2 having traveled through the points, and pieces of third cumulative relative frequency distribution information related to data obtained by compiling traveling energy amounts depending on the traveling time or the traveling distance from individual points in low-prediction accuracy zones having a low accuracy of prediction of a predicted value of the traveling energy amount.

The data structure is used in the server 3 for the process of calculating, when a vehicle 2 is located in a low-prediction accuracy zone, a predicted value of the traveling load amount depending on the traveling time or the traveling distance from the low-prediction accuracy zone based on third cumulative relative frequency distribution information.

In the low-prediction accuracy zone, the predicted traveling energy amount is calculated based on the zone data structure in which the data obtained by compiling the traveling energy amounts at the individual points in the zone is organized as the cumulative relative frequency distribution. Therefore, it is possible to suppress a significant deviation of the predicted traveling energy amount even if the actual traveling point of the driver's vehicle 2a and the point detected by the GPS receiver 96 deviate from each other in the low-prediction accuracy zone.

Although the embodiments of the present disclosure are described above, the embodiments are only part of the examples of application of the present disclosure, and are not intended to limit the technical scope of the present disclosure to the specific structures of the embodiments.

For example, in the embodiments described above, the data structure is generated by organizing the data on the traveling energy amounts Ep for the preheating time from the individual points in association with the individual vehicle traveling directions as the cumulative relative frequency distributions, and the predicted energy amount Epest for the preheating time from the current position is calculated by referring to the data structure.

The present disclosure is not limited to this case. For example, when the data structure is generated by organizing data on traveling loads Pp at individual points in association with individual vehicle traveling directions as cumulative relative frequency distributions, traveling loads at individual points where the vehicle is expected to travel in the future can accurately be predicted by referring to the data structure. A predicted energy amount to be needed in the future may be calculated by adding up the predicted values of the traveling loads at the individual points where the vehicle is expected to travel in the future. That is, as a data structure for accurately predicting the traveling energy amount to be needed in the future, the data structure may be generated by organizing the data on the traveling loads Pp at the individual points in association with the individual vehicle traveling directions as the cumulative relative frequency distributions.

In the embodiments described above, in order to set the warming start charge amount SOC2 to an appropriate value, the data structure is generated by organizing the data on the traveling energy amounts Ep for the preheating time from the individual points as the cumulative relative frequency distributions.

When the data structure is generated by organizing data on traveling energy amounts Ep for a predetermined time or a predetermined distance from individual points as cumulative relative frequency distributions, traveling energy amounts Ep for the predetermined time or the predetermined distance from a current position and a certain point in the future can accurately be predicted by referring to the data structure. The prediction results can be used not only for setting the warming start charge amount SOC2 but also for various types of control as follows.

For example, when the hybrid vehicle or the plug-in hybrid vehicle travels along a road having a large traveling load during the CS mode, the internal combustion engine 10 needs to be operated at a large load. As a result, the catalyst device 15 may deteriorate because the catalyst device 15 is continuously exposed to high-temperature exhaust gas.

For example, a traveling energy amount Ep for the predetermined time or the predetermined distance from a current position is predicted during the EV mode. When the predicted traveling energy amount Ep is equal to or larger than a predetermined amount $\beta1$, that is, when there is a strong possibility that the vehicle may travel at a large load in the future, the internal combustion engine 10 is started at that timing and operated at a small load to charge the battery 50 in advance. Therefore, when the vehicle actually travels along the road having a large traveling load, the vehicle can travel in the EV mode while stopping the internal combustion engine 10. Thus, it is possible to suppress the deterioration of the catalyst device 15 due to the long exposure of the catalyst device 15 to the high-temperature exhaust gas.

The hybrid vehicle or the plug-in hybrid vehicle provides a predetermined deceleration feel by charging the battery 50 when the vehicle is traveling along a downward slope. When the battery 50 is fully charged, however, the battery 50 cannot be charged. Therefore, the internal combustion engine 10 needs to be started to provide the predetermined deceleration feel by a so-called engine brake. Thus, the fuel efficiency decreases due to the start of the engine.

For example, a traveling energy amount Ep for the predetermined time or the predetermined di stance from a current position is predicted. When the predicted traveling energy amount Ep is smaller than a predetermined amount $\beta2$, that is, when there is a strong possibility that the vehicle may travel along a road having a small load in the future, possibly a downward slope, the traveling mode is switched to the EV mode to actively reduce the battery charge amount SOC. Therefore, there is no need to start the internal combustion engine 10 in order to merely provide the deceleration feel by the engine brake. Thus, the decrease in the fuel efficiency can be suppressed.

In the first embodiment, the data structure is created in association with individual points by organizing the data on the traveling energy amounts Ep for the predetermined time or the predetermined distance from the individual points as the cumulative relative frequency distributions. When roads on the map are divided into a plurality of sections and individual identifiers (IDs) (link IDs) are assigned to the road sections in advance, the data structure may be created in association with the road sections by organizing data on traveling energy amounts Ep for the predetermined time or the predetermined distance from the individual road sections as cumulative relative frequency distributions.

What is claimed is:

1. A non-transitory storage medium for use in an information processing device in a vehicle control system, the storage medium storing:
   pieces of positional information each associated with a unique traveling point of traveling points that one or more of a plurality of vehicles have traveled through;
   pieces of first cumulative relative frequency distribution information associated with individual vehicle traveling directions, the pieces of first cumulative relative frequency distribution information being related to first data on traveling load amounts of the plurality of vehicles at the traveling points or the traveling load amounts of the plurality of vehicles a traveling time or a traveling distance away from the traveling points;

pieces of second cumulative relative frequency distribution information associated with the individual vehicle traveling directions, the pieces of second cumulative relative frequency distribution information being related to second data on the traveling load amounts of the plurality of vehicles at additional points different from the traveling points the traveling time or the traveling distance away from the traveling points, the additional traveling points identifying where the plurality of vehicles travel to after an elapse of a predetermined maximum communication delay time from the traveling points; and instructions that are executable by one or more processors and that cause the one or more processors to perform functions comprising:
calculating a predicted value of a traveling load amount of the traveling load amounts for each vehicle of the plurality of vehicles depending on the traveling time or the traveling distance from an arbitrary traveling point of the traveling points or of the additional traveling points based on the pieces of first cumulative relative frequency distribution information and the pieces of second cumulative relative frequency distribution information associated with each individual vehicle traveling direction of the individual vehicle traveling directions at the arbitrary traveling point, and when a request signal containing a current position and a current traveling direction of a first vehicle of the plurality of vehicles is received from the first vehicle,
setting the current position as the arbitrary traveling point and setting the current traveling direction as a first vehicle traveling direction of the individual vehicle traveling directions;
calculating the predicted value of a first traveling load amount as the traveling load amount depending on the traveling time or the traveling distance away from the arbitrary traveling point based on the pieces of first cumulative relative frequency distribution information associated with the first vehicle traveling direction at the arbitrary traveling point;
calculating the predicted value of a second traveling load amount as the traveling load amount depending on the traveling time or the traveling distance away from the arbitrary traveling point based on the pieces of second cumulative relative frequency distribution information associated with the first vehicle traveling direction at the arbitrary traveling point; and
transmitting the predicted value of the first traveling load amount and the predicted value of the second traveling load amount to the first vehicle, wherein, at a time of receipt of the predicted value of the first traveling load amount and the predicted value of the second traveling load amount at the first vehicle, the vehicle control system is configured to enable the first vehicle to update the predicted value of the traveling load amount using linear interpolation to account for an additional predicted traveling load used for heating a catalyst device associated with an exhaust passage of an internal combustion engine onboard the first vehicle during a preheating time based on the current position of the first vehicle at the time of receipt, the predicted value of the first traveling load amount, the predicted value of the second traveling load amount and the time of receipt.

2. The non-transitory storage medium according to claim 1, wherein:
the non-transitory storage medium further stores pieces of third cumulative relative frequency distribution information related to third data obtained by compiling the traveling load amounts of the plurality of vehicles of the traveling points or of the additional traveling points in prescribed zones depending on the traveling time or the traveling distance away from the traveling points or the additional traveling points in the prescribed zones; and
the functions further comprise:
calculating, when the request signal containing the current position of the first vehicle of the plurality of vehicles indicates that the first vehicle is located in one of the prescribed zones, the predicted value of a third traveling load amount as the traveling load amount depending on the traveling time or the traveling distance away from the traveling points or the additional traveling points in the prescribed zone based on the third cumulative relative frequency distribution information associated with the first vehicle traveling direction at the traveling points or the additional traveling points in the prescribed zone; and
transmitting the predicted value of the third traveling load amount to the first vehicle.

3. The non-transitory storage medium according to claim 2, wherein each of the prescribed zones is a first prescribed zone comprising a plurality of intersecting roads that have grade separation, a second prescribed zone comprising a plurality of neighboring roads with a first difference in height, or a third prescribed zone comprising a plurality of neighboring branching roads with a second difference in height.

4. The non-transitory storage medium according to claim 1, wherein:
the first vehicle further includes a battery configured to be charged and discharged,
the catalyst device is electrically-heated through energization of a conductive substrate, and
the vehicle control system is further configured to enable the first vehicle to set a target value of a charge amount of the battery where the preheating time is started based on the update to the predicted value of the traveling load amount using the additional predicted traveling load.

5. The non-transitory storage medium according to claim 1, wherein:
the first vehicle further includes:
a battery configured to be charged and discharged, and
a traction motor to be driven by electric power of the battery; and
the vehicle control system is further configured to enable the first vehicle to:
when the update to the predicted value of the traveling load amount using the additional predicted traveling load is equal to or larger than a predetermined value while the first vehicle is traveling with driving power of the traction motor alone, start to charge the battery with driving power of the internal combustion engine; and
when the update to the predicted value of the traveling load amount using the additional predicted traveling load is smaller than the predetermined value while the internal combustion engine is running, cause the first vehicle to travel with driving power of the traction motor alone while stopping the internal combustion engine.

6. A vehicle control device comprising:

an electronic control unit, the electronic control unit being configured to control a first vehicle of a plurality of vehicles in a vehicle control system based on a predicted value of a traveling load amount of the first vehicle of the plurality of vehicles that is calculated by using a data structure, the data structure being used by an information processing device in the vehicle control system, the data structure including:
  pieces of positional information each associated with a unique traveling point of traveling points that one or more of the plurality of vehicles have traveled through;
  pieces of first cumulative relative frequency distribution information associated with individual vehicle traveling directions, the pieces of first cumulative relative frequency distribution information being related to first data on traveling load amounts of the plurality of vehicles at the traveling points or the traveling load amounts of the plurality of vehicles a traveling time or a traveling distance away from the traveling points; and
  pieces of second cumulative relative frequency distribution information associated with the individual vehicle traveling directions, the pieces of second cumulative relative frequency distribution information being related to second data on the traveling load amounts of the plurality of vehicles at additional points different from the traveling points the traveling time or the traveling distance away from the traveling points, the additional traveling points identifying where the plurality of vehicles travel to after an elapse of a predetermined maximum communication delay time from the traveling points,
wherein the information processing device is configured to:
  calculate, by using the data structure, the predicted value of the traveling load amount of the traveling load amounts for each vehicle of the plurality of vehicles depending on the traveling time or the traveling distance from an arbitrary traveling point of the traveling points or of the additional traveling points based on the pieces of first cumulative relative frequency distribution information and the pieces of second cumulative relative frequency distribution information associated with each individual vehicle traveling direction of the individual vehicle traveling directions at the arbitrary traveling point, and
  when a request signal containing a current position and a current traveling direction of the first vehicle of the plurality of vehicles is received from the first vehicle,
    set the current position as the arbitrary traveling point and set the current traveling direction as a first vehicle traveling direction of the individual vehicle traveling directions;
    calculate the predicted value of a first traveling load amount as the traveling load amount depending on the traveling time or the traveling distance away from the arbitrary traveling point based on the pieces of first cumulative relative frequency distribution information associated with the first vehicle traveling direction at the arbitrary traveling point;
    calculate the predicted value of a second traveling load amount as the traveling load amount depending on the traveling time or the traveling distance away from the arbitrary traveling point based on the pieces of second cumulative relative frequency distribution information associated with the first vehicle traveling direction at the arbitrary traveling point; and
    transmit the predicted value of the first traveling load amount and the predicted value of the second traveling load amount to the first vehicle, and
wherein, at a time of receipt of the predicted value of the first traveling load amount and the predicted value of the second traveling load amount at the first vehicle, the electronic control unit is configured to update the predicted value of the traveling load amount using linear interpolation to account for an additional predicted traveling load used for heating a catalyst device associated with an exhaust passage of an internal combustion engine onboard the first vehicle during a preheating time based on the current position of the first vehicle at the time of receipt, the predicted value of the first traveling load amount, the predicted value of the second traveling load amount and the time of receipt.

7. The vehicle control device according to claim 6, wherein:
  the first vehicle further includes a battery configured to be charged and discharged,
  the catalyst device is electrically-heated through energization of a conductive substrate, and
  the electronic control unit is further configured to set a target value of a charge amount of the battery where the preheating time is started based on the update to the predicted value of the traveling load amount using the additional predicted traveling load.

8. The vehicle control device according to claim 6, wherein:
  the first vehicle further includes:
    a battery configured to be charged and discharged, and
    a traction motor to be driven by electric power of the battery; and
  the electronic control unit is further configured to, when the update to the predicted value of the traveling load amount using the additional predicted traveling load is equal to or larger than a predetermined value while the first vehicle is traveling with driving power of the traction motor alone, start to charge the battery with driving power of the internal combustion engine.

9. The vehicle control device according to claim 6, wherein:
  the first vehicle further includes:
    a battery configured to be charged and discharged, and
    a traction motor to be driven by electric power of the battery; and
  the electronic control unit is further configured to, when the update to the predicted value of the traveling load amount using the additional predicted traveling load is smaller than a predetermined value while the internal combustion engine is running, cause the first vehicle to travel with driving power of the traction motor alone while stopping the internal combustion engine.

10. The vehicle control device according to claim 6, wherein:
- the data structure further including pieces of third cumulative relative frequency distribution information related to third data obtained by compiling the traveling load amounts of the plurality of vehicles of the traveling points or of the additional traveling points in prescribed zones depending on the traveling time or the traveling distance away from the traveling points or the additional traveling points in the prescribed zones; and
- the information processing device further configured to:
  - calculate, by using the data structure, when the request signal containing the current position of the first vehicle of the plurality of vehicles indicates that the first vehicle is located in one of the prescribed zones, the predicted value of a third traveling load amount as the traveling load amount depending on the traveling time or the traveling distance away from the traveling points or the additional traveling points in the prescribed zone based on the third cumulative relative frequency distribution information associated with the first vehicle traveling direction at the traveling points or the additional traveling points in the prescribed zone; and
  - transmit the predicted value of the third traveling load amount to the first vehicle.

11. The vehicle control device according to claim 10, wherein each of the prescribed zones is a first prescribed zone comprising a plurality of intersecting roads that have grade separation, a second prescribed zone comprising a plurality of neighboring roads with a first difference in height, or a third prescribed zone comprising a plurality of neighboring branching roads with a second difference in height.

* * * * *